United States Patent
Filart

(10) Patent No.: US 11,799,922 B2
(45) Date of Patent: Oct. 24, 2023

(54) NETWORK CORE FACILITATING TERMINAL INTEROPERATION

(71) Applicant: T-Mobile USA, Inc., Bellevue, WA (US)

(72) Inventor: Homer Nicolas B. Filart, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 431 days.

(21) Appl. No.: 15/386,436

(22) Filed: Dec. 21, 2016

(65) Prior Publication Data

US 2018/0176266 A1    Jun. 21, 2018

(51) Int. Cl.
*H04L 65/1104* (2022.01)
*H04L 65/75* (2022.01)
*H04L 65/1069* (2022.01)
*H04L 65/1033* (2022.01)
(Continued)

(52) U.S. Cl.
CPC ........ *H04L 65/1104* (2022.05); *H04L 65/104* (2013.01); *H04L 65/1069* (2013.01); *H04L 65/765* (2022.05); *H04W 88/16* (2013.01); *H04W 88/181* (2013.01)

(58) Field of Classification Search
None
See application file for complete search history.

(56) References Cited

U.S. PATENT DOCUMENTS

| | | | |
|---|---|---|---|
| 6,785,263 B1 * | 8/2004 | Morinaga | H04L 12/66 370/352 |
| 7,768,998 B1 | 8/2010 | Everson et al. | |
| 9,826,072 B1 * | 11/2017 | Filart | H04L 65/1069 |

(Continued)

FOREIGN PATENT DOCUMENTS

| | | |
|---|---|---|
| CN | 1531814 A | 9/2004 |
| CN | 101278278 A | 10/2008 |

(Continued)

OTHER PUBLICATIONS

"ETSI TS 123 334 v 13.5.0, Technical Specification", Apr. 2016, pp. 1, 4-8, 10-18, 29-46.

(Continued)

*Primary Examiner* — Chirag G Shah
*Assistant Examiner* — Joshua Smith
(74) *Attorney, Agent, or Firm* — Lee & Hayes, P.C.

(57) ABSTRACT

An anchoring network device of a telecommunications network can receive a first initiation request of a communication session and determine a second request indicating a different media capability than the first request. A network gateway can modify packets of the session, e.g., by transcoding between the capabilities. In some examples, the anchoring device can determine that a codec list of the initiation request corresponds to a rewrite rule. The device can apply the rewrite rule to the request to provide a second request listing a second, different codec. In some examples, the anchoring device can determine if there is a common media capability between the first initiation request and a predetermined exclusion list. If not, the second request can include at least one capability not in the first request, e.g., an Enhanced Voice Services (EVS) Channel-Aware-mode (ChAw) codec.

20 Claims, 10 Drawing Sheets

(51) Int. Cl.
*H04W 88/16* (2009.01)
*H04W 88/18* (2009.01)

(56) References Cited

U.S. PATENT DOCUMENTS

| | | | |
|---|---|---|---|
| 2003/0229699 A1 | 12/2003 | Voran et al. | |
| 2004/0037406 A1* | 2/2004 | Gourraud | H04L 29/06027 |
| | | | 379/202.01 |
| 2004/0148416 A1* | 7/2004 | Aarnos | H04L 29/12066 |
| | | | 709/230 |
| 2004/0264482 A1 | 12/2004 | Kang et al. | |
| 2007/0135146 A1 | 6/2007 | Rezaiifar et al. | |
| 2007/0211683 A1 | 9/2007 | Shaheen et al. | |
| 2008/0062253 A1 | 3/2008 | Jaspersohn et al. | |
| 2008/0160996 A1 | 7/2008 | Li et al. | |
| 2008/0240091 A1 | 10/2008 | Kesavan et al. | |
| 2009/0006533 A1 | 1/2009 | Guo | |
| 2009/0154658 A1 | 6/2009 | Kasper et al. | |
| 2009/0201910 A1 | 8/2009 | Kumarasamy et al. | |
| 2009/0210743 A1 | 8/2009 | Gu et al. | |
| 2009/0290573 A1* | 11/2009 | Belling | H04L 65/1043 |
| | | | 370/352 |
| 2010/0054159 A1 | 3/2010 | Zhu et al. | |
| 2010/0125631 A1 | 5/2010 | Zhang et al. | |
| 2010/0144325 A1 | 6/2010 | Roundtree et al. | |
| 2010/0184403 A1 | 7/2010 | Cai et al. | |
| 2010/0272072 A1 | 10/2010 | Bienn et al. | |
| 2011/0010768 A1 | 1/2011 | Barriga et al. | |
| 2011/0028130 A1* | 2/2011 | Swaminathan | H04L 65/104 |
| | | | 455/414.1 |
| 2011/0047282 A1* | 2/2011 | Denman | H04L 65/605 |
| | | | 709/231 |
| 2011/0136483 A1 | 6/2011 | Dwight et al. | |
| 2011/0222532 A1 | 9/2011 | Noldus | |
| 2011/0310884 A1 | 12/2011 | Arauz-Rosado | |
| 2012/0002718 A1 | 1/2012 | Jun et al. | |
| 2012/0185600 A1 | 7/2012 | Belling et al. | |
| 2012/0225652 A1 | 9/2012 | Martinez et al. | |
| 2012/0244861 A1 | 9/2012 | Agarwal et al. | |
| 2013/0021998 A1* | 1/2013 | Shatsky | H04W 28/26 |
| | | | 370/329 |
| 2013/0024332 A1 | 1/2013 | Cai et al. | |
| 2013/0185440 A1* | 7/2013 | Blau | H04L 61/2589 |
| | | | 709/227 |
| 2013/0191536 A1* | 7/2013 | Noldus | H04L 65/1006 |
| | | | 709/224 |
| 2013/0212293 A1 | 8/2013 | Friedman | |
| 2013/0223304 A1 | 8/2013 | Tanaka et al. | |
| 2013/0246052 A1* | 9/2013 | Tanaka | H04L 65/605 |
| | | | 704/201 |
| 2013/0290494 A1 | 10/2013 | Goudarzi et al. | |
| 2014/0050179 A1* | 2/2014 | Jung | H04W 28/24 |
| | | | 370/329 |
| 2014/0149562 A1 | 5/2014 | Xiao et al. | |
| 2014/0328323 A1 | 11/2014 | Zhang et al. | |
| 2014/0342739 A1 | 11/2014 | Hori | |
| 2014/0372557 A1 | 12/2014 | Buckley et al. | |
| 2015/0045074 A1* | 2/2015 | Wong | H04W 4/14 |
| | | | 455/466 |
| 2015/0063346 A1 | 3/2015 | Eswara et al. | |
| 2015/0131652 A1 | 5/2015 | Telikepalli et al. | |
| 2015/0172349 A1 | 6/2015 | Gonzalez De Langarica et al. | |
| 2015/0350983 A1 | 12/2015 | Kwok et al. | |
| 2015/0358809 A1 | 12/2015 | Lau et al. | |
| 2016/0021336 A1 | 1/2016 | Abbott et al. | |
| 2016/0028790 A1 | 1/2016 | Eriksson et al. | |
| 2016/0072868 A1 | 3/2016 | Poulin | |
| 2016/0105468 A1 | 4/2016 | Mufti et al. | |
| 2016/0127295 A1 | 5/2016 | Karimli et al. | |
| 2016/0142447 A1 | 5/2016 | Mufti et al. | |
| 2016/0286027 A1 | 9/2016 | Lee et al. | |
| 2016/0308919 A1 | 10/2016 | Hori | |
| 2016/0323425 A1* | 11/2016 | Atarius | H04L 69/324 |
| 2016/0359942 A1* | 12/2016 | Li | H04L 65/1069 |
| 2016/0380693 A1* | 12/2016 | Scott | H04B 7/18513 |
| | | | 455/427 |
| 2018/0026746 A1* | 1/2018 | Bruhn | H04L 1/0082 |
| | | | 714/746 |
| 2018/0048748 A1* | 2/2018 | Lundstrom | H04L 65/80 |
| 2018/0288105 A1 | 10/2018 | Iyer et al. | |
| 2019/0173925 A1 | 6/2019 | Mufti et al. | |
| 2020/0045168 A1 | 2/2020 | Sinha | |
| 2020/0287944 A1 | 9/2020 | Mufti et al. | |
| 2020/0358736 A1 | 11/2020 | Pascal et al. | |
| 2021/0006605 A1 | 1/2021 | Iyer et al. | |

FOREIGN PATENT DOCUMENTS

| | | |
|---|---|---|
| CN | 101534229 A | 9/2009 |
| CN | 102025715 A | 4/2011 |
| CN | 102223386 A | 10/2011 |
| CN | 102347950 A | 2/2012 |
| EP | 2081349 | 7/2009 |
| EP | 2782386 A1 | 9/2014 |
| WO | WO03032585 A1 | 4/2003 |
| WO | WO2015129181 A1 | 9/2015 |
| WO | WO2016081430 | 5/2016 |

OTHER PUBLICATIONS

"ETSI TS 126 171 v13.0.0, Technical Specification", Jan. 2016, 14 pages.
"ETSI TS 126 190 v13.0.0, Technical Specification", Jan. 2016, pp. 1, 4-8, 13-14, 50-51.
"ETSI TS 126 201 v13.0.0, Technical Specification", Jan. 2016, 25 pages.
"ETSI TS 126 202 v13.0.0, Technical Specification", Jan. 2016, 15 pages.
"ETSI TS 126 441 v13.0.0, Technical Specification", Jan. 2016, 14 pages.
"ETSI TS 126 445 v 13.1.0, Technical Specification", May 2016, pp. 1, 4-16, 17, 20-24, 415-416, 443-448, 589, 506-625, 636, and 635-654.
"ETSI TS 126 446 v 13.0.0, Technical Specification", Jan. 2016, 10 pages.
"EVS Registration IANA" retrieved Jul. 28, 2016, at <<https://www.iana.org/assignments/media-types/audio/EVS>>, 4 pages.
"H.248", Wikipedia, retrieved on Dec. 20, 2016 from <<https://en.wikipedia.org/wiki/H.248>>, 6 pages.
Jarvinen, K., "Enhanced Voice Services Codec for LTE", retrieved Jul. 12, 2016 at <<http://www.3gpp.org/news-events/3gpp-news/1639-evs_news>>, 2 pages.
PCT Search Report and Written Opinion dated Jan. 22, 2016 for PCT application No. PCT/US2015/054233, 15 pages.
Schulzrinne, H.and T. Taylor, "RTP Payload for DTMF Digits, Telephony Tones, and Telephony Signals", The IETF Trust, Dec. 2006, 49 pages. RFC 4733.
Sjoberg, J., et al., "RTP Payload Format and File Storage Forma for the Adaptive Multi-Rate (AMR) and Adaptive Multi-Rate Wideband (AMR-WB) Audio Codecs", RFC 4867 (Standards Track), Apr. 2007, pp. 1-4, 13-34, 44-47.
"Volte—Some Thoughts on codec Negotiation", retrieved Jul. 28, 2016, from <<https://blog.wirelessmoves.com/2016/03/volte-some-thoughts-on-codec-negotiation.html>>, 3 pages.
"Multimedia Messaging Service", Wikipedia, retrieved May 24, 2017 from <<https://en.wikipedia.org/wiki/Multimedia_Messaging_Service>>, 5 pages.
Office Action for U.S. Appl. No. 14/788,591, dated May 2, 2017, Mufti et al., "Service Capabilities in Heterogeneous Network", 22 pgs.
"Presence Simple Specification", Open Mobile Alliance, Version 2.0, Jul. 10, 2012, 102 pages.
"Rich Communication Services", Wikipedia, retrieved May 24, 2017, from <<https://en.wikipedia.org/wiki/Rich_Communication_Services>>, 9 pages.
Rosenberg, J., "A Presence Event Package for the Session Initiation Protocol (SIP)", Standards Track, Request for comments: 3856, Aug. 2004, 27 pages.

(56) References Cited

OTHER PUBLICATIONS

Schulzrinne, H., et al., "RPID: Rich Presence Extensions to the Presence Information Data Forma (PIDF)", Standards Track, Request for Comments: 4480, Jul. 2006, 37 pages.
Sugano, H., et al., "Presence Information Data Format (PIDF)", Standards Track, Request for Comments: 3863, Aug. 2004, 28 pages.
"What You Really Need to Know About Video Conferencing Systems", retrieved Feb. 24, 2017 from <<http://www.c21video.com/whitepapers/what_to_know_about_video_conferencing.html>>, 12 pages.
Office action for U.S. Appl. No. 15/280,234, dated Jul. 3, 2017, Filart et al., "Network-Terminal Nteroperation Using Compatible Payloads", 27 pages.
Office Action for US Patent Application, dated Aug. 18, 2017, Mufti, "Service Capabilities in Heterogeneous Network" 34 pages.
"RCS Interworking Guidelines", GSM Association, Official Document IR 90, Version 13 0, May 6, 2016, pp. 1-3 and 11-16.
"RCS Universal Profile Service Definiition Document", GSM Association, Official Document RCC.71, Version 1.0, Nov. 16, 2016, pp. 1-5 and 97-122.
"Real Time Communication—Messaging in RCS", retrieved Aug. 22, 2017, from <<https://realtimecommunication.wordpress.com/2014/11/14/messaging-in-rcs/>>, 12 pages.
Roach, A.B., "Session Initiation Protocol (SIP)—Specific Event Notification", Request for Comments 3265, Standards Track, Jun. 2002, pp. 3-7, 14-15, 18-19, and 21-27.
Rosenberg, J., et al., "An Offer/Answer Model with the Session Description Protocol (SDP)", Request for Comments 3264, Standards Track, Jun. 2002, pp. 1-5, 9, and 12-19.
Rosenberg, J., et al., "SIP: Session Initiation Protocol", Request for Comments 3261, Standards Track, Jun. 2002, pp. 1-8 and 66-68.
Extended European Search Report dated Feb. 28, 2018 for European Patent Application No. 15849735.4, 9 pages.
PCT Search Report and Written Opinion dated Jan. 26, 2018 for PCT Application No. PCT/US17/54320, 14 pages.
Office action for U.S. Appl. No. 15/280,234, dated Feb. 9, 2017, Filart et al., "Network-Terminal Interoperation Using Compatible Payloads", 23 pages.
ETSI TS 126 114 V13.4.0, "Universal Mobile Telecommunications System (UMTS); LTE; IP Multimedia Subsystem (IMS); Multimedia Telephony; Media Handling and Interaction", Aug. 2016, pp. 236-240.
PCT Search Report and Written Opinion dated Apr. 13, 2018 for PCT Application No. PCT/US17/64514, 14 pages.
Office Action for U.S. Appl. No. 15/476,299, dated Apr. 12, 2019, Iyer, "Terminal Interoperation Using Called-Terminal Functional Characteristics," 24 pages.
Extended European Search Report dated Dec. 20, 2019 for European Patent Application No. 17857504.9, 10 pages.
Chinese Office Action dated Aug. 28, 2019 for Chinese Patent Application No. 201580064492.3, 18 pages.
GSM Association, "Rich Communication Suite 6.0 Advanced Communications Services and Client Specification," Version 7.0, Feb. 19, 2016, pp. 1-581.
Office Action for U.S. Appl. No. 15/476,299, dated Sep. 18, 2019, Iyer, et al. "Terminal Interoperation Using Called-Terminal Functional Characteristics," 32 pages.
Translated Chinese Office Action dated Apr. 22, 2020 for Chinese Patent Application No. 201580064492.3, a counterpart of U.S. Pat. No. 10,148,703, 4 pages.
Extended European Search Report dated Apr. 1, 2020 for European Patent Application No. 17883216.8, a counterpart of U.S. Appl. No. 15/386,436, 9 pages.
Translation of First Office Action dated May 27, 2021 for Chinese Patent Application No. 201780078566.8, a counterpart foreign application of U.S. Appl. No. 15/386,436, 16 pages.
Translation of First Office Action dated Jan. 18, 2021 for Chinese Patent Application No. 201780060043.0, a counterpart foreign application of U.S. Pat. No. 9,826,072, 21 pages.
Office Action for U.S. Appl. No. 17/013,320, dated Sep. 1, 2021, Iyer, "Terminal Interoperation Using Called-Terminal Functional Characteristics", 13 pages.
Office Action for U.S. Appl. No. 17/013,320, dated Jan. 7, 2022, Iyer, "Terminal Interoperation Using Called-Terminal Functional Characteristics", 16 pages.

\* cited by examiner

NETWORK CORE FACILITATING TERMINAL INTEROPERATION

BACKGROUND

A computing device configured for telecommunications, such as a wireless phone, is generally capable of processing various types and encodings of media. However, not all telecommunications devices connectable via a particular network necessarily support the same types or encodings. This can restrict users' ability to communicate with other users having different types of telecommunications devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. The figures are not necessarily to scale.

For brevity of illustration, in the diagrams herein, an arrow beginning with a diamond connects a first component or operation (at the diamond end) to at least one second component or operation that is or can be included in the first component or operation in at least one example.

DETAILED DESCRIPTION

Overview

Figure 1:
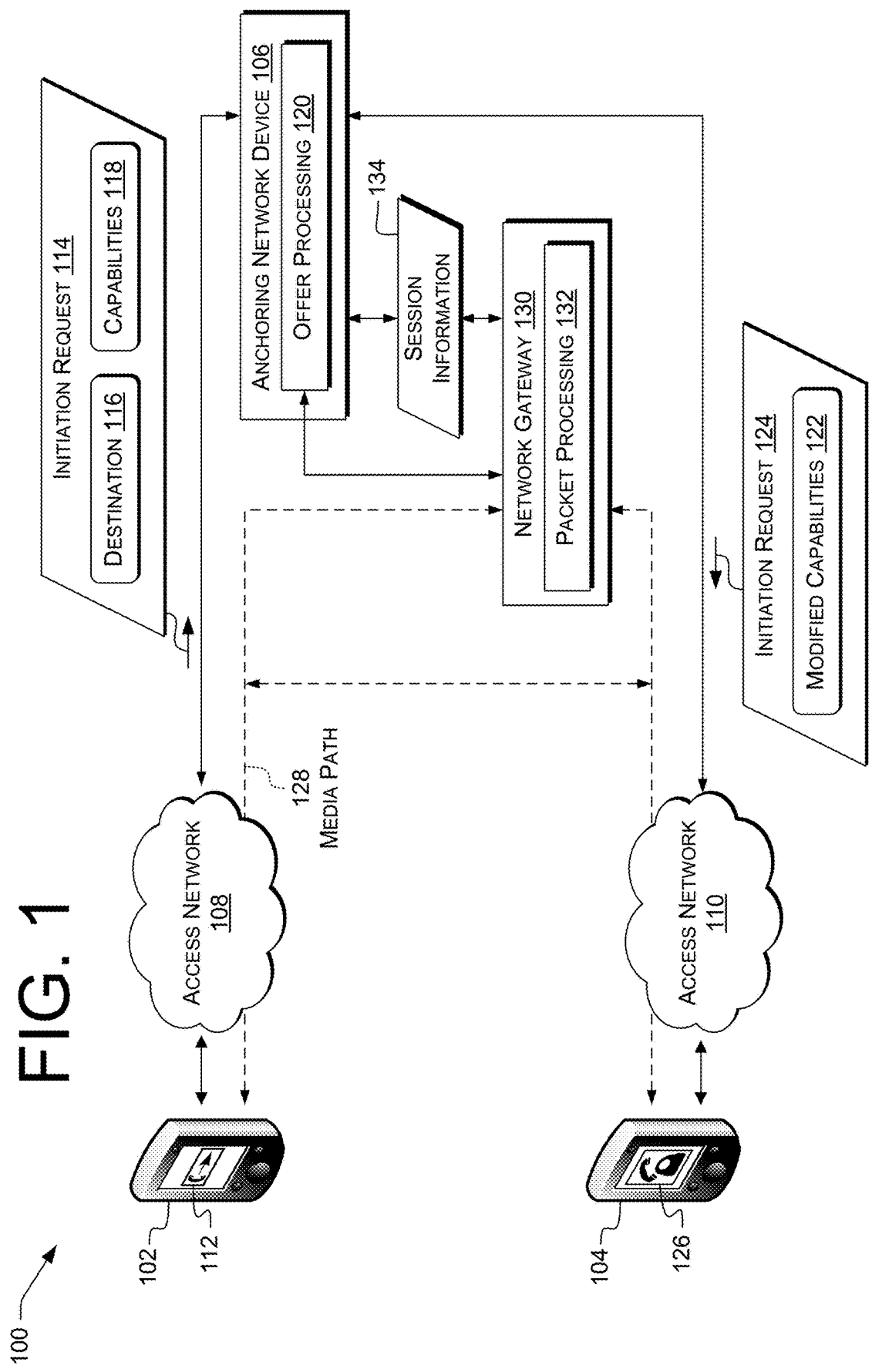
FIG. 1 is a block diagram illustrating a telecommunication system for implementing capability-information modification according to some implementations.

Digitized voice can be encoded with a variety of coding/decoding procedures, or "codecs." The Enhanced Voice Services (EVS) codec, defined in Third-Generation Partnership Project (3GPP) TS 26.441, 26.445, and related standards, has a channel-aware ("ChAw") mode in which it can provide improved signal integrity compared to standard EVS modes. However, in some prior schemes, a destination terminal such as a mobile terminating (MT) device can only select from among codecs or modes offered by an origin terminal (e.g., a mobile originating, MO, device). Therefore, the destination terminal in such schemes cannot enable ChAw if the origin terminal does not support ChAw. In some examples herein, if an initiation request of a communication session does not offer EVS ChAw, an anchoring network device can amend the offer to include EVS ChAw, e.g., as the preferred codec. In this way, even if the origin terminal does not support EVS, the destination terminal can use and benefit from EVS ChAw mode. A network gateway can transcode between EVS ChAw mode and codec(s) supported by the origin terminal. Specific codecs are discussed herein for clarity of explanation, e.g., EVS ChAw mode. However, these codecs are not limiting, and examples herein can additionally or alternatively be used for other robustness-enhancing codec sets.

As used herein, a "terminal" is a communication device, e.g., a cellular telephone or other user equipment (UE), configured to perform, or intercommunicate with systems configured to perform, techniques described herein. Terminals can include, e.g., wireless voice- or data- communication devices. A terminal can include a user interface (e.g., as does a smartphone), but is not required to. For example, an example terminal can be a mobile hotspot such as an access point for an Institute of Electrical and Electronics Engineers (IEEE) 802.11 (WIFI) network using Long Term Evolution (LTE) as an upstream connection. Such a terminal may not include a user interface.

Systems and techniques described herein permit terminals to communicate data, e.g., voice or video, even when one of the terminals supports a signal-integrity technique, media type, encoding, or format that another one of the terminals does not. As used herein, the terms "capabilities" and "media capabilities" refer to data types, encodings, formats, bit rates, protocols, underlying protocols, compression techniques, profiles, signal-integrity techniques such as error-detection or error-correction techniques, coding/decoding procedure (codecs), or combinations of any of those, that are supported by a terminal for the exchange of data with other terminals. The term "session" as used herein includes a communications path for bidirectional exchange of data among two or more terminals. Example sessions include voice and video calls, e.g., by which human beings converse, a data communication session, e.g., between two electronic systems or between an electronic system and a human being, or a Rich Communication Services (RCS, also known as JOYN) session. Systems and techniques herein permit terminals having certain capabilities to communicate with terminals not having those capabilities, e.g., without requiring computationally-expensive transcoding or other manipulation of the payloads of packets of the session. In some examples, the communication is facilitated transparently to the intercommunicating terminals. The term "packet" is used herein to refer generally to data packets, frames, datagrams, or any other identifiable units of data that include a header and a payload and that are transmitted or received via a communication network.

Many networks are "heterogeneous networks," i.e., networks including terminals with various sets of capabilities. For example, many LTE cellular networks support voice over LTE (VoLTE) and also interconnect with the public switched telephone network (PSTN). Voice calls using VoLTE may be encoded or decoded using any one of a variety of codecs, e.g., an adaptive multi-rate (AMR) codec or an EVS codec. Wideband AMR (AMR-WB), for example, encodes audio data in the frequency range of approximately 50 Hz-7000 Hz into compressed data at bit rates between, e.g., 6.6 kbps and 23.85 kbps, e.g., 12.65 kbps. Another example of a codec is narrowband AMR (AMR-NB), which encodes audio data in the frequency range of approximately 200 Hz-3400 Hz.

The EVS codec encodes 16-bit linear pulse code modulated (PCM) audio samples covering frequency ranges up to 16 kHz (super wide-band, SWB) or up to 20 kHz (full-band, FB) at sampling rates of 8 kHz, 16 kHz, 32 kHz, or 48 kHz. Compressed EVS data can have bit rates between 5.9 kbit/s and 128 kbit/s, or between 6.6 kbit/s and 23.85 kbit/s for interoperability with AMR-WB. EVS ChAw mode can transmit data at 13.2 kbit/s and cover WB or SWB audio-frequency ranges. In ChAw mode, the EVS decoder handles out-of-order or lost packets by holding packets in a de jitter buffer and by transmitting partial copies ("redundant data") of earlier frames of audio data along with later frames. This permits data to be retrieved from a later frame already stored in the de-jitter buffer to fill in an earlier frame whose data is not available, e.g., because of packet loss.

EVS can, e.g., provide the same audio quality as some prior codecs even in the presence of 2 dB additional path loss. This permits maintaining audio quality farther from the antenna, increasing the coverage radius and reducing the cost and energy consumption of network infrastructure. Moreover, EVS ChAw mode permits maintaining the quality of a voice call even in high-loss environments such as near the edge of LTE coverage. Furthermore, the amount of redundant data transmitted by EVS in ChAw mode can be adjusted by the audio encoder. In some examples, the network gateway controls the amount of redundant data based on the quality of the connection between the destination terminal and its eNodeB or other radio site to reduce the network overhead of the redundant data.

As AMR-WB, EVS, and other new codecs are developed, voice calls between VoLTE terminals may require transcoding or specific codec selection if one VoLTE terminals supports a codec, such as EVS, that the other VoLTE terminal does not. Similarly, transcoding may be required for interworking with environments such as personal computers (PCs), which can use codecs such as Vorbis, e.g., in an Ogg container, or Opus, used in the WebRTC (Web Real-Time Communication) protocol. Transcoding may also be required for interworking with the PSTN, which generally carries uncompressed audio in the 300 Hz-3400 Hz band formatted according to the International Telecommunications Union (ITU) G.711 standard as uncompressed, 8-bit PCM logarithmically-quantized samples. However, transcoding can be computationally expensive, and can introduce latency in to transmission of packets of a communication session. Therefore, it is desirable to avoid transcoding whenever possible.

Codecs are also used for video. Example codecs used in LTE networks include ITU H.263, Moving Picture Experts Group (MPEG) standards such as MPEG-4 part 2, and H.264/MPEG-4 part 10. However, many other video codecs are used in other environments, e.g., Theora, QUICKTIME, VP6, and VP8 in personal computer (PC) environments, and MPEG-1 and MPEG-2 in older PCs or telecommunication systems. As with audio, video communications between terminals with different codec capabilities may require transcoding or specific codec selection. Video transcoding can be computationally expensive.

Various examples herein permit interworking advanced techniques with installed equipment not supporting those techniques. For example, various techniques herein permit interworking EVS ChAw-mode codecs on a VoLTE network with non-EVS-capable, e.g., AMR-WB, VoLTE user equipment. Various examples herein permit interworking between circuit-switched (CS) and packet-switched (PS) environments, or between cellular and PC environments. Various examples herein permit additional or removal of offered codecs or other capabilities that are applicable to the called party's network, terminal, or environment, but that are not offered by, or are not applicable to, the calling party's network, terminal, or environment. Examples can include, e.g., voice-over-Internet Protocol (IP), or "VoIP," calls from a Web browser or IPAD application using Opus via a WebRTC gateway to an IP Multimedia Subsystem (IMS) subscriber, or vice versa). Such interworking can permit introducing new voice-enhanced codecs or other capabilities, e.g., in the IMS core with 3GPP access (e.g., VoLTE) or non-3GPP access (e.g., Wireless Local Area Network, WLAN, or WebRTC).

In a nonlimiting example, if a SIP transmission (e.g., an INVITE request to begin a communication session) does not include EVS support, an anchoring network device can amend the transmission to include EVS ChAw mode as a preferred codec. In this way, if the called party supports EVS ChAw mode, even if the calling party does not, the called party can still use EVS ChAw-mode rather than having to fall back to AMR-WB or another codec. The EVS party can therefore benefit from using EVS ChAw mode, while still being able to communicate with a party that does not support EVS ChAw mode. A network gateway can then transcode between EVS ChAw and the calling party's codec, while controlling the EVS ChAw link to improve network bandwidth utilization. Example techniques herein can additionally or alternatively be used for other codecs.

In some examples, a telecommunication system can include an anchoring network device and a network gateway. The anchoring network device can modify an initiation request or response of a communication session to change information of at least one media capability therein. The network gateway can transcode payloads of packets in the communication session to convert between media capabilities, e.g., codecs.

Illustrative Configurations

FIG. 1 is a block diagram illustrating a telecommunication system 100 according to some examples. The system includes terminals 102 and 104, e.g., user equipment or other mobile phones or communications devices or terminals. The terminals 102 and 104 can be operated, e.g., by a user and a second user respectively (not shown). The terminals 102 and 104 are communicatively connected to an anchoring network device 106, e.g., via respective access networks 108 and 110. The anchoring network device 106 can include, e.g., an Access Transfer Control Function (ATCF) of an IMS in a VoLTE-capable network, e.g., of an originating or terminating IMS. A telecommunications network can include, or can intercommunicate with or via, access networks 108 and 110.

The terminals 102 and 104 may be implemented as any suitable computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the terminals 102 and 104 as being "mobile" or "wireless," (e.g., configured to be carried and moved around), it is to be appreciated that the terminals 102 and 104 may represent various types of communication devices that are generally stationary as well, such as televisions, desktop computers, game consoles, set top boxes, and the like. In this sense, the terms "communication device," "wireless device," "wireline device," "mobile device," "computing device," "terminal," "user equipment," and "UE" may be used interchangeably herein to describe any communication device capable of performing the techniques described herein. In some examples, some terminals can have specific media handling requirements and thus only accept specific media codecs or components in a session description.

A communication session between terminals 102 and 104 is managed by signaling traffic, e.g., packets conveying instructions to set up or tear down the communication session. In some examples herein, signaling traffic is described in the context of the Session Initiation Protocol (SIP, RFC 3261). However, this is not limiting, and other signaling protocols and techniques can be used with, or to implement, functions described herein. In some examples, signaling traffic of a communication session, e.g., SIP requests and responses or other signaling traffic, may pass to or through anchoring network device 106 or other proxies, user-agent servers or clients, or back-to-back user agents (B2BUAs). SIP or other signaling traffic can include an initiation request from a calling terminal (e.g., terminal 102), to a called terminal (e.g., terminal 104). The use of "calling" and "called" does not imply that the session must be a voice call.

As used herein, an "anchoring network device" is a network device through which at least some signaling traffic for a communication session, e.g., SIP traffic, passes for the duration of an established phase of the communication session. That session is "anchored" at the anchoring network device. Anchoring signaling traffic for a session can increase network robustness by isolating the two sides of the anchoring network device. For example, terminal 102 is not required to change its SIP (or other signaling) route to terminal 104 when terminal 104 is handed over from access network 110 to another access network, since that SIP route between terminals 102 and 104 passes through anchoring network device 106. In some examples, anchoring takes place in response to receipt by anchoring network device 106 of a SIP INVITE request, and the anchoring network device 106 transmits a SIP 183 Session in Progress response once anchoring is complete, e.g., once anchoring network device 106 has recorded an indication that the communication session is anchored at that anchoring network device 106. As used herein, a SIP response code ending in "xx", e.g., a SIP 1xx Provisional response, signifies any response of, e.g., class 1 of SIP responses (RFC 3261, § 7.2).

When the first user desires to place a call to the second user, the terminal 102, e.g., in response to actuation by the first user of a "Send" control 112, transmits an initiation request 114 of a communication session, e.g., a SIP INVITE request, via first access network 108 to called terminal 104. Transmission of the initiation request 114 begins a "pre-establishment" phase of the communication session, e.g., a SIP "early dialog state" (RFC 3261, § 12). The terminal 102 is an example of a calling terminal, e.g., a session-originating device that initiates a communication session with a called terminal such as terminal 104. Session-originating devices can include user equipment or other telecommunications or terminals communicatively connectable with other terminals via anchoring network device 106. Mobile phones and copper-loop landline phones can be examples of session-originating devices.

The initiation request 114, e.g., an outgoing voice call, includes information of a destination 116, e.g., a called terminal 104 with which calling terminal 102 is requesting a session be established. In this example, only one destination is shown, namely the terminal 104. However, the initiation request 114 can specify any number of destinations. The initiation request 114 also includes information 118 indicating one or more media capabilities of the terminal 102. The information 118 of the one or more media capabilities is also referred to as an "offer." In an example, the initiation request 114 includes a SIP INVITE message having a Session Description Protocol (SDP) body including a session description, e.g., the information 118 of the one or more media capabilities. For example, the information 118 can include at least one SDP attribute ("a=") line, e.g., "a=rtpmap:110 amr-wb/16000" for AMR-WB at a 16 kHz sampling rate.

In some examples, the information 118 can indicate multiple codecs or other capabilities. In some examples, the information 118 can indicate priority relationships between the listed capabilities. For example, an SDP body can include a media description ("m=") line listing multiple formats, e.g., multiple codecs. The formats can be listed in descending order of priority, so that, e.g., the most preferred format is listed first on the "m=" line.

The anchoring network device 106 receives from the terminal 102 the initiation request 114 and performs offer processing 120, e.g., as described below with reference to FIG. 2. In some examples, the offer processing 120 modifies the information 118 of the one or more media capabilities to provide modified information 122 of the one or more media capabilities. The anchoring network device 106 then transmits a second initiation request 124 including the modified information 122 to the destination, e.g., to the terminal 104, or to an anchoring network device corresponding to the destination, e.g., a serving call session control function (S-CSCF) communicatively connected with the terminal 104.

In some examples, the anchoring network device 106 can interact with the network gateway 130 during offer processing 120. This can permit, e.g., filtering or modifying information 118 or modified information 122 based on what codecs or other media capabilities network gateway 130 supports. In some examples in which network gateway 130 performs transcoding (e.g., as discussed herein with reference to operation 408), the anchoring network device 106 can interact with the network gateway 130 to determine what codec pairs the network gateway 130 can support for transcoding.

The terminal 104 thus receives an initiation request 124 including modified information 122 of the one or more media capabilities. The terminal 104 can respond, e.g., by alerting the second user and transmitting a SIP 180 Ringing response to the terminal 102 (e.g., following exchange of SIP 183, PRACK, UPDATE, and associated 200 OK messages, in some examples). The user of the terminal 104 can then indicate the call should be accepted, e.g., by operating a call-acceptance control 126 such as a touchscreen button. The terminal 104 can then accept the initiation request, e.g., by sending a SIP 200 OK response to the terminal 102. When the called terminal 104 accepts the communication session, e.g., by transmitting the SIP 200 OK, the communication session enters an "established" phase, e.g., a SIP "confirmed dialog state" (RFC 3261, § 12). During the established phase, data can be exchanged between participating terminals. In some examples, the data includes digitized audio of a voice call, DTMF (dual-tone multi-frequency) tone information, or digitized video.

Call initiation can be performed, e.g., as defined in the Global System for Mobile (GSM) or VoLTE standards, and can include the exchange of additional messages (not shown) between the terminals 102 and 104 and the anchoring network device 106. Data of the session, such as audio data or video data formatted as specified in the modified information 122, can be exchanged between terminals 102 and 104 via a communications channel depicted as media path 128, which can pass through anchoring network device 106 or (as shown) can bypass anchoring network device 106.

In some examples, media path 128 can pass through a network gateway 130. For example, the network gateway 130 can include an Access Transfer Gateway (ATGW), e.g., of an originating or terminating IMS. The network gateway can perform packet processing 132 to modify ("rewrite") headers or payloads of packets passing through the network gateway 130. Packet processing 132 can be performed, e.g., to transcode payload data between codecs, as described in more detail below. In some examples, anchoring network device 106 can provide to network gateway 130 information 134 of communication session(s), or media stream(s) within those session(s), for which the headers should be modified. As used herein, the term "network gateway" can indicate, but does not require that, network gateway 130 connects two different networks. Network gateway 130 can be configured to pass traffic between different networks or between different terminals in a particular network, in some nonlimiting examples.

Figure 2:
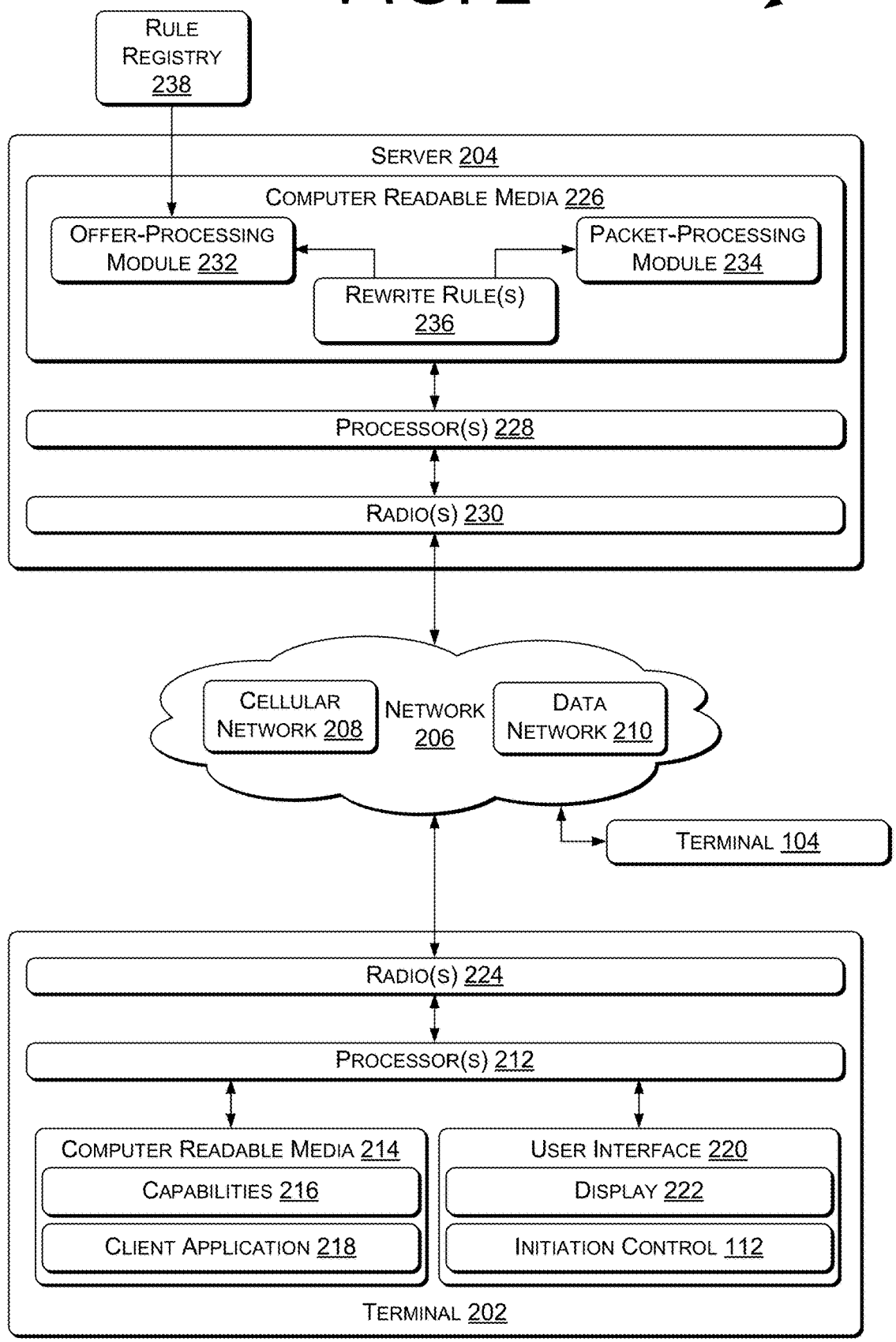
FIG. 2 is a block diagram illustrating a system for implementing capability-information modification according to some implementations.

FIG. 2 is a block diagram illustrating a telecommunication system 200 permitting capability-information modification and codec interworking according to some implementations. The system 200 includes a terminal 202, e.g., a wireless phone or other user equipment such as terminal 102 or 104, FIG. 1, coupled to a server 204 via a network 206. The server 204 can be an example of the anchoring network device 106, FIG. 1, e.g., an ATCF, or of the network gateway 130, FIG. 1, e.g., an ATGW. The network 206 can include one or more networks, such as a cellular network 208 and a data network 210. The network 206 can include one or more core network(s) connected to user equipment via one or more access network(s), e.g., access networks 108 or 110.

The cellular network 208 can provide wide-area wireless coverage. Example cellular networks 208 can include second-generation (2G) cellular networks such as the GSM or Code Division Multiple Access (CDMA), or third-generation (3G) cellular networks such as the Universal Mobile Telecommunications System (UMTS). Other example cellular networks 208 can include Enhanced Data GSM Environment (EDGE), GSM EDGE Radio Access Network (GERAN), UMTS Terrestrial Radio Access Network (UTRAN), or fourth-generation (4G) cellular networks, such as LTE carrying VoLTE sessions using SIP signaling. Other example cellular networks 208 can include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Advanced Mobile Phone System (AMPS), High Speed Packet Access (HSPA), evolved HSPA (HSPA+), The data network 210 can include various types of networks for transmitting and receiving data (e.g., packets), including networks using technologies such as IEEE 802.1x protocols, wireless microwave access (WIMAX), WIFI, IEEE 802.15.1 ("BLUETOOTH"), Asynchronous Transfer Mode (ATM), and other network technologies, e.g., configured to transport IP packets, and/or any future IP-based network technology or evolution of an existing IP-based network technology. In some examples, the server 204 includes or is communicatively connected with an interworking function (IWF) or other device bridging networks, e.g., LTE, 3G, or POTS networks. In some examples, the server 204 can bridge SS7 traffic from the PSTN into the network 206, e.g., permitting PSTN customers to place calls to cellular customers and vice versa.

In some examples, the cellular network 208 and the data network 210 can carry voice or data. For example, the data network 210 can carry voice traffic using Voice over Internet Protocol (VoIP) or other technologies as well as data traffic, or the cellular network 208 can carry packets using High Speed Packet Access (HSPA), LTE, or other technologies as well as voice traffic. Some cellular networks 208 carry both data and voice in a packet-switched format. For example, many LTE networks carry voice traffic in packets according to the voice-over-LTE (VoLTE) standard. Many data networks 210 can carry over-the-top (OTT) sessions encapsulating, e.g., voice or video data in a way transparent to an underlying packet transport. Various examples herein provide origination and termination of, e.g., carrier-grade voice calls on, e.g., circuit-switched (CS) networks 206 or mixed VoLTE/3G networks 206, and on terminals 202 including original equipment manufacturer (OEM) handsets and non-OEM handsets. Communications between the server 204 and terminals such as the terminal 202 can additionally or alternatively be performed using other types of networks 206, such as Ethernet, optical links (e.g., Synchronous Optical NETwork, SONET), or other computer networks, or Plain Old Telephone Service (POTS) or PSTN lines, e.g., using Signaling System 7 (SS7) signaling.

The terminal 202 can be or include a wireless phone or any other type of terminal, such as discussed herein with reference to FIG. 1. The terminal 202 can include one or more processors 212, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Terminal 202 can include one or more computer readable media (CRM) 214, such as memory (e.g., random access memory (RAM), solid state drives (SSDs), or the like), disk drives (e.g., platter-based hard drives), another type of computer-readable media, or any combination thereof. The computer readable media 214 can be used to store data and to store instructions that are executable by the processors 212 to perform various functions as described herein. The computer readable media 214 can store various types of instructions and data, such as an operating system, device drivers, etc. The processor-executable instructions can be executed by the processors 212 to perform the various functions described herein.

The computer readable media 214 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 212. Tangible computer-readable media can include volatile and nonvolatile, removable and non-removable media implemented in any method or technology for storage of information, such as computer readable instructions, data structures, program modules, or other data.

The computer readable media 214 can store information 216 of one or more capabilities of the terminal 202. The information 216 can include, e.g., indications of voice or video codecs supported by the terminal 202.

The computer readable media 214 can include processor-executable instructions of a client application 218. The client application 218, e.g., a native or other dialer, can permit a user to originate and terminate communication sessions associated with the terminal 202, e.g., wireless phone. In some examples, the terminal 202 can transmit to the server 204 the initiation request 114 indicating the destination 116 and the information 118 of the capabilities, e.g., as discussed above with reference to FIG. 1.

The terminal 202 can further include a user interface (UI) 220, e.g., including a display 222, e.g., an electronic display device, a speaker, a vibration unit, a touchscreen, or other devices for presenting information to a user and receiving commands from the user. The user interface 220 can include a session-initiating user interface control 112, e.g., a touchscreen or physical button, to indicate a communication session should be initiated. The user interface 220 or components thereof, e.g., the display 222, can be separate from the terminal 202 or integrated with the terminal 202. The terminal 202 can further include one or more radio(s) 224 configured to selectively communicate wirelessly via the network 206, e.g., via an access network 108 or 110, or one or more transceivers (not shown) configured to selectively communicate using wired connections via the network 206.

The server 204 can include one or more computer readable media 226 communicatively connected with one or more processors 228. The processor(s) 228 can be connected with one or more radio(s) 230 permitting processor(s) 228 to communicate via network 206. Computer readable media 226 can be of any of the types described herein with reference to computer readable media 214. Processor(s) 228 can be of any of the types described herein with reference to processor(s) 212. Radio(s) 230 can be of any of the types described herein with reference to radio(s) 224.

The computer readable media 226 can be used to store processor-executable instructions of an offer-processing module 232 (which can perform offer processing 120) or a packet-processing module 234 (which can perform packet processing 132). The processor-executable instructions can be executed by the processors 228 to perform various functions described herein. In some examples, server 204 includes either offer-processing module 232 or packet-processing module 234. In other examples, server 204 includes both offer-processing module 232 and packet-processing module 234.

In some examples, the computer readable media 226 or another component of the server 204 also stores rewrite rules 236, discussed below. In some examples, the server 204 is communicatively connected with a rule registry 238 separate from the server 204 that stores the rewrite rules 236. The server 204 can retrieve rewrite rules 236 or other information from the rule registry 238 via, e.g., a SIP MESSAGE request or an HTTP request such as a GET to a Web Services or Representational State Transfer (REST) application programming interface (API) endpoint. The server 204 can be configured to (e.g., by executing instructions stored in computer-readable media 226) retrieve from the rule registry 238 rewrite rules 236, e.g., corresponding to the initiation request 114.

The rewrite rules 236 (of which there can be one or more) can specify one or more capabilities to remove from the information of the one or more media capabilities. The one or more capabilities to remove can include, e.g., one or more codecs. The rewrite rules 236 can additionally or alternatively specify one or more capabilities to add to the information of the one or more media capabilities. The one or more capabilities to add can include, e.g., one or more codecs. The rewrite rules 236 can specify additions, deletions, modifications of codec type or parameters, or other changes. The rewrite rules 236 can specify that changes are contingent on certain conditions, or that specific rewrite rules apply only to specific conditions. For example, the rewrite rules 236 can specify that, if an initiation request 114 does not include an offer specifying an EVS codec, the initiation request 124 should specify EVS ChAw mode as the highest-priority codec. The rewrite rules 236 can specify that a particular codec and its corresponding media description information should be removed from the offer. Media description information in an SDP body can include, e.g., lines beginning with "i=", "c=", "b=", "k=", or "a=" after an "m=" line and before the next consecutive "m=" line (RFC 4566, section 5, pg. 8). References herein to "rewrite rules" in the plural do not require that any described operation involve more than one of the rewrite rules 236, although operations may involve more than one of the rewrite rules 236. Of the rewrite rules 236, some may be applicable only to offers (e.g., block 314, FIG. 3), some may be applicable only to responses (e.g., block 404, FIG. 4), or some may be applicable to both offers and responses.

Still referring to FIG. 2 and also referring to FIG. 1, in some examples, offer-processing module 232 can modify the information 118 of the one or more media capabilities based at least in part on the rewrite rules 236 to determine the modified information 122. The server 204 can then transmit the initiation request 124 including the modified information 122 to terminal 104, e.g., via a second anchoring network device (omitted for brevity), e.g., on the terminating side of the session. For example, the second anchoring network device can be an S-CSCF of terminating user equipment or a Breakout Gateway Control Function (BGCF) for bridging calls to non-VoLTE networks. The second anchoring network device can receive the initiation request 124 from the server 204 and pass it to the terminal 104 (e.g., user equipment).

In some examples, packet-processing module 234 can receive packets from terminal 202 or terminal 104. Packet-processing module 234 can modify at least one header or at least one payload of a received packet to provide a modified packet. Packet-processing module 234 can then transmit the modified packet toward its destination (e.g., terminal 104 or terminal 202). For example, using EVS ChAw mode in a communication session via techniques described herein can reduce packet jitter by taking advantage of EVS enhanced jitter buffer management and redundant-data transmission. This can mitigate RF channel fluctuations, reduce the rate of lost packets, or increase audio quality. The EVS-capable terminal can also benefit from features of EVS such as lost-frame interpolation, voice activity detection (VAD), and comfort noise generation (CNG), even if a non-EVS terminal in the session cannot.

Figure 3:
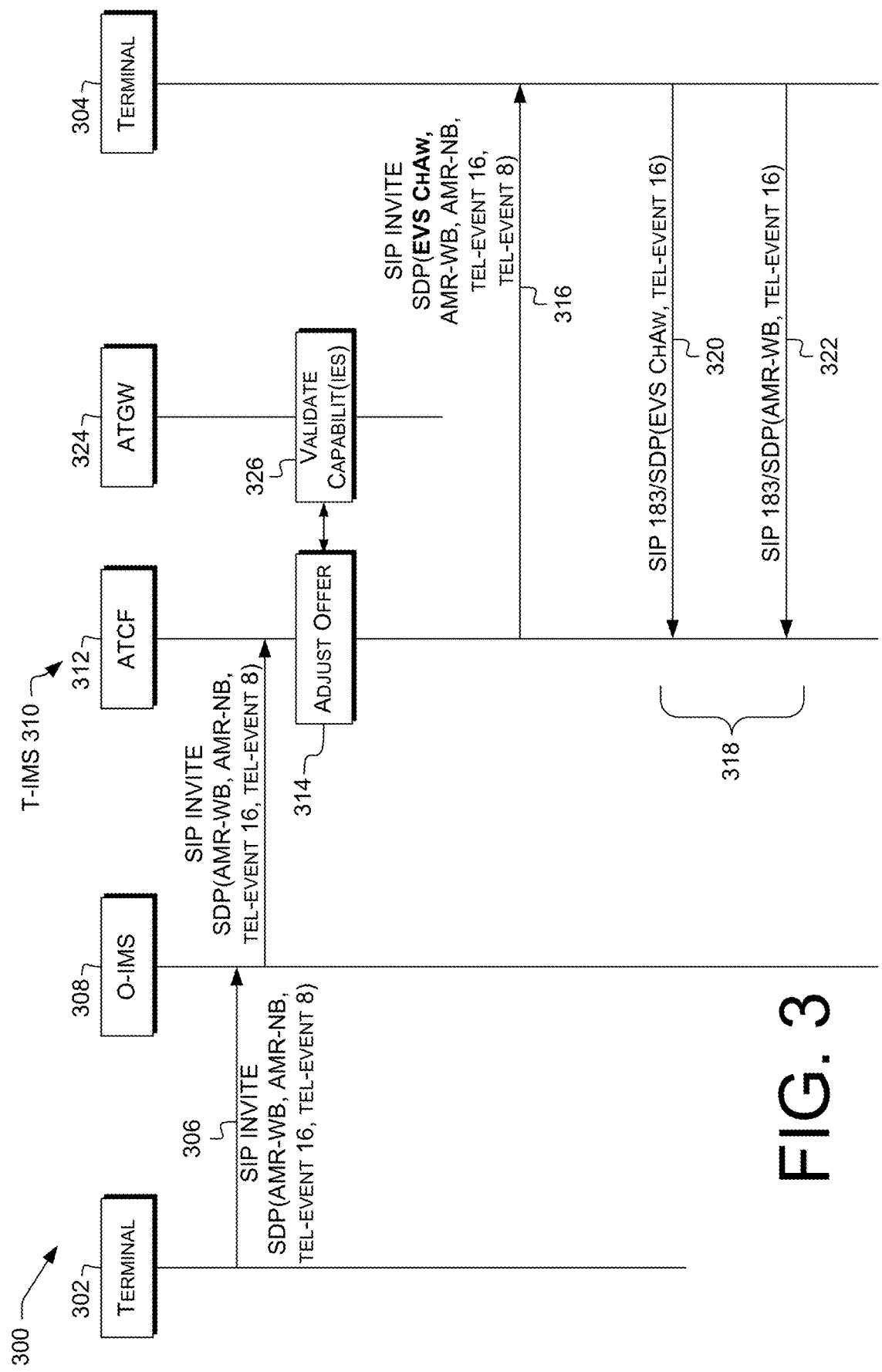
FIG. 3 shows an example call flow illustrating modification of media-capability information in an initiation request of a communication session.

FIG. 3 shows an example call flow 300 from a terminal 302, which can represent calling terminal 102, to a terminal 304, which can represent called terminal 104. Example functions described herein with reference to FIG. 3 can be performed, e.g., by offer-processing module 232 of server 204 or another anchoring network device 106.

Figure 4:
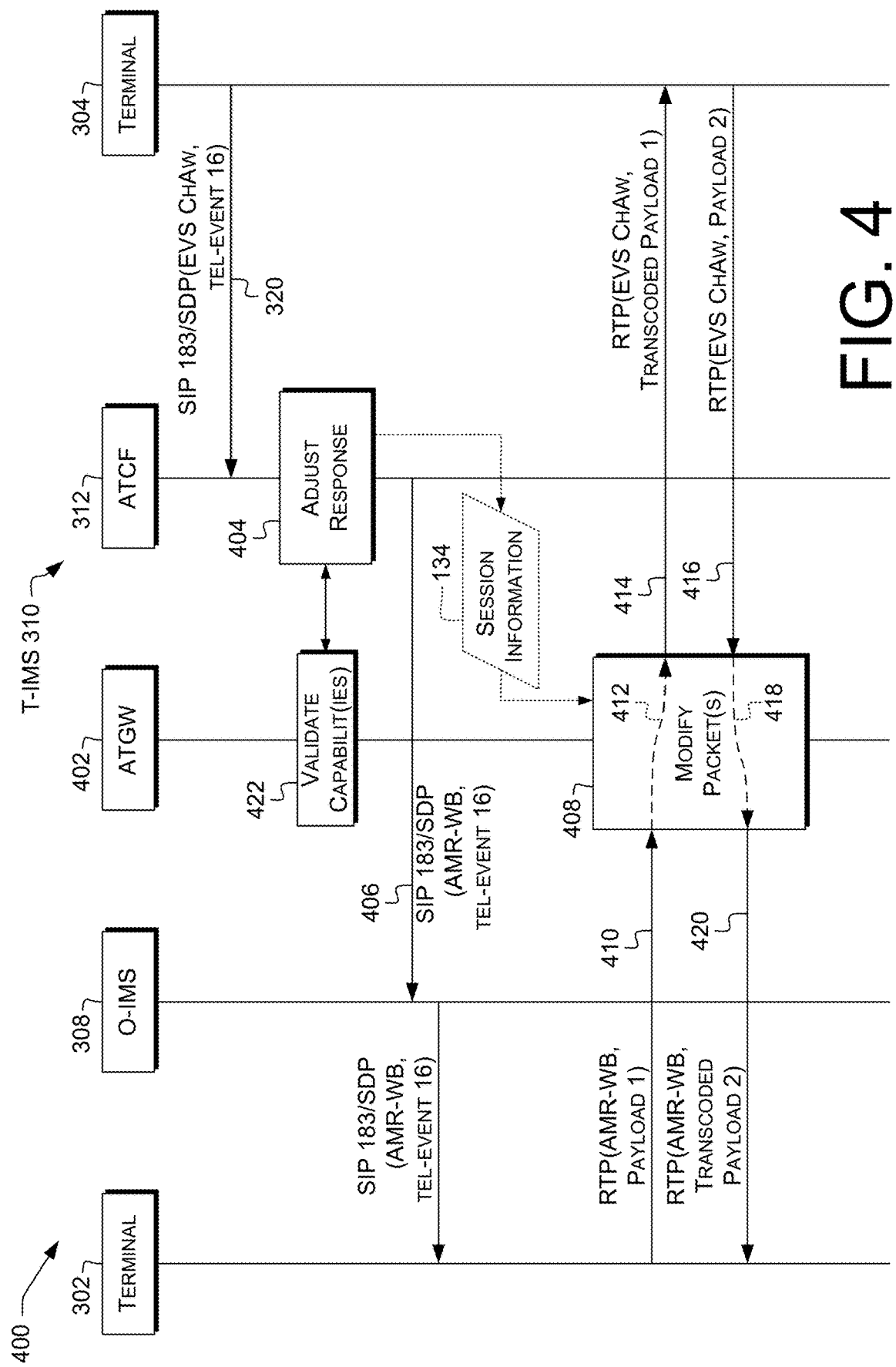
FIG. 4 shows an example call flow illustrating modification of media-capability information in an initiation response and data packets of the communication session of FIG. 3.

Terminal 302 sends an initiation request 306, e.g., in the form of a SIP INVITE with an SDP message body. Initiation request 306 can represent initiation request 114. In this example, the SDP body offers the AMR-WB, AMR-NB, and two telephone-event ("tel-event") codecs. One illustrated tel-event codec has a sampling-frequency parameter of 8 kHz, so is abbreviated as "tel-event 8." The other has a sampling-frequency parameter of 16 kHz and is abbreviated as "tel-event 16". An originating IMS ("O-IMS") 308 forwards the initiation request 306 to a terminating IMS 310. In the illustrated example, the initiation request 306 reaches a terminating ATCF 312 of the terminating IMS 310. ATCF 312 can represent server 204 or another anchoring network device 106. In some examples, the initiation request 306 can be proxied, received, or otherwise handled by additional or alternative device(s), e.g., ATGW 324, discussed below, or ATGW 402 (FIG. 4).

At block 314, which can represent at least part of offer processing 120, the ATCF 312 can retrieve rewrite rules 236, e.g., from the rule registry 238. The ATCF 312 modifies the information 118 of the one or more media capabilities (e.g., in the SDP body), e.g., based at least in part on the rewrite rules 236. In this example, the rewrite rules 236 specify that if the information 118 does not include EVS, EVS ChAw mode should be added to the front of the codec list as the new highest-priority codec. In this example, the rewrite rules 236 also specify that tel-event at 16 kHz ("tel-event 16") should be added before the first tel-event (if any) in the information 118. Accordingly, ATCF 312 determines the modified information 122 including a modified SDP body listing (newly added) EVS ChAw mode, AMR-WB, AMR-NB, telephone-event at 16 kHz (newly added if it was not present in the information 118 of initiation request 306), and telephone-event at 8 kHz. For example, EVS ChAw mode can be indicated by an encoding name of "EVS" and a "ch-aw-recv" format parameter having a value of, e.g., 0, 2, 3, 5, or 7 (e.g., an "a=fmtp:110 ch-aw-recv=2" line in the modified SDP body). ATCF 312 transmits to terminal 304 a second initiation request 316, e.g., in the form of a SIP INVITE including the modified SDP body. Second initiation request 316 can represent initiation request 124. These examples of rewrites are not limiting. Various examples of rewrite rules 236 can add rules to the front or back of the codec list, or in the middle of the codec list, e.g., immediately before or after a specified codec.

Terminal 304 can respond to second initiation request 316 depending on the codec support of terminal 304, e.g., stored in information 216. FIG. 3 shows two alternatives 318. In an example in which terminal 304 supports EVS ChAw mode, terminal 304 responds with response 320, e.g., a SIP 183 Session in Progress response including an SDP body indicating support for EVS ChAw mode (e.g., including "a=rtpmap . . . EVS" and "a=fmtp . . . ch-aw-recv=2" lines). In an example in which terminal 304 does not support EVS but does support AMR-WB, terminal 304 selects the highest-priority codec it supports, here AMR-WB, and responds with response 322, e.g., a SIP 183 with an SDP body indicating support for AMR-WB (e.g., including an "a=rtpmap . . . AMR-WB" line but no "a=rtpmap . . . EVS" line). In response 320, since EVS is selected, tel-event at 16 kHz is also selected. In response 322, since AMR-WB is selected, tel-event at 16 kHz is also selected.

In some examples, initiation request 306 can offer EVS without ChAw, e.g., instead of or in addition to other codecs or tel-event capabilities. In some of these examples, at operation 314, ATCF 302 identifies that ChAw mode is not in the offer, it can add EVS with ChAw (e.g., including "a=rtpmap . . . EVS" and "a=fmtp . . . ch-aw-recv=2" lines) to the front of the codec list as the new highest-priority codec.

In some examples of FIG. 3, the originating terminal 302 supports AMR-WB and the terminating terminal 304 supports EVS ChAw mode (response 320). In some examples, the originating terminal 302 can support EVS ChAw mode and the terminating terminal 304 can support AMR-WB. Therefore, the ATCF 312 or other network devices, e.g., an ATCF of the originating IMS 308, can apply rewrite rules 236 as described with reference to ATCF 312.

In some examples, T-IMS 310 can include a network gateway 130, in this example an ATGW 324. In some examples, at operation 314, ATCF 312 can interact with ATGW 324. For example, ATCF 312 and ATGW 324 can communicate via the H.248 Gateway Control Protocol, also referred to as "MEGACO." ATCF 312 can send information of the offer to ATGW 324. At operation 326, ATGW 324 can receive the offer indicating at least one media capability. The ATGW 324 can filter or validate the at least one media capability to provide an updated offer. For example, the ATGW 324 can determine the updated offer including only media capabilities supported by the capability or configuration of the ATGW 324. The ATGW 324 can transmit the updated offer back to the ATCF 312, which can then provide the updated offer to terminal 304 as part of second initiation request 316. In some examples, operations 314 and 326 can include respective exchanges to determine the updated offer including, e.g., specific bit rates or bandwidths of codecs (e.g., WB but not SWB, or bit rates lower than a predetermined threshold). In some examples, the updated offer can indicated whether EVS ChAw mode is supported and configured in the ATGW 324.

FIG. 4 shows an example call flow 400, e.g., beginning with response 320 (EVS ChAw mode), FIG. 3. FIG. 4 shows terminal 302, O-IMS 308, ATCF 312, and terminal 304 as in FIG. 3. FIG. 4 also shows ATGW 402, which can represent server 204 or another network gateway 130, FIG. 1, or ATGW 324, FIG. 3. Example functions described herein with reference to FIG. 4 can be performed by packet-processing module 234 of server 204 or another network gateway 130. In some examples, network gateway 130, e.g., ATGW 402, can be co-located with or incorporated into an anchoring network device 106, e.g., ATCF 312. Alternatively, ATCF 312 and ATGW 402 can be, or be incorporated into, distinct devices.

In some examples, at block 404, which can represent at least part of offer processing 120, ATCF 312 can apply rewrite rules 236 to the response from terminal 304, e.g., response 320. In the illustrated example, terminal 304 supports EVS ChAw mode, and terminal 302 supports AMR-WB. ATCF 312 can rewrite the SDP body of the SIP 183 response 320 to provide response 406 indicating a selection of AMR-WB instead of EVS ChAw mode. For example, ATCF 312 can remove an "a=rtpmap . . . EVS" line and an "a=fmtp . . . ch-aw-recv" line in the SDP body of response 320 and insert an "a=rtpmap . . . AMR-WB" line to form response 406. O-IMS 308 can forward response 406 to terminal 302.

In some examples, block 404 can additionally or alternatively include providing information 134 of the communication session including initiation request 306 and response 320. At block 404, ATCF 312 can provide session information 134 (shown dashed for clarity) to ATGW 402. In the examples of FIGS. 3 and 4, and other examples, the initiation request 306 and the second initiation request 316 comprise respective SIP INVITE requests and the initiation response 320 and the second initiation response 406 comprise respective SIP 1xx responses.

In some examples, at block 408, which can represent at least part of packet processing 132, ATGW 402 can modify a header or payload of a packet from terminal 302 to terminal 304, or from terminal 304 to terminal 302. ATGW 402 can perform operations of block 408, e.g., in response to session information 134, or in accordance with predetermined criteria stored in other otherwise accessible to ATGW 402. In some examples, block 408 can include modifying packets only to terminal 304, only to terminal 302, or in either direction. In some examples, block 408 can include modifying packets of unicast or multicast communication sessions.

In some examples, session information 134 can indicate specific source or destination addresses or ports, or other criteria to determine which packets or packet types should be processed at block 408. For example, at block 404, ATCF 312 can determine the session information 134 based at least in part on address or port information in second initiation request 306 or 316, or response message 320 or 322. ATGW 402 can then modify headers, at block 408, of packets, e.g., having source or destination addresses or ports indicated in the session information 134.

In an example of SIP, SDP using sendrecv (bidirectional) streams, and AMR-WB, initiation request 306 from the calling terminal 302 can include a "c=" line indicating a network address of terminal 302 (e.g., "c=IN IP4 192.168.13.37" for IPv4 address 192.168.13.37) and an "m=" line specifying that terminal 302 would like to receive audio on a specific port (e.g., "m=audio 49152 RTP/AVP 96" for User Datagram Protocol, UDP, port 49152). Response message 320 from the called terminal 304 can include a "c=" line indicating a network address of terminal 304 (e.g., 10.42.42.42) and an "m=" line specifying that terminal 304 would like to receive audio on a specific port (e.g., UDP port 44100). ATCF 312 can provide the session information 134 including the addresses and ports to ATGW 402. ATGW 402 can then modify packets, in this example, addressed to 192.168.13.37:49152/udp or 10.42.42.42:44100/udp (address:port/protocol). ATGW 402 can, in some examples, forward unchanged (or with headers unmodified) packets not matching criteria indicated in the session information 134.

In an illustrated example, without limitation, packet 410 is a Real-time Transport Protocol (RTP) packet including an AMR-WB header and a payload ("Payload 1"). The payload can include a core frame representing audio. At block 408, operation 412, ATGW 402 can modify packet 410 to provide packet 414. Packet 414 can be an RTP packet including an EVS ChAw header and payload. At operation 412, ATGW 402 can remove the AMR-WB header and payload, transcode the payload data to EVS ChAw, and insert an EVS ChAw header and payload to provide packet 414. In another illustrated example, packet 416 is an RTP packet including an EVS ChAw header and a payload ("Payload 2"). At block 408, operation 418, ATGW 402 can replace the EVS ChAw header with an AMR-WB header, and transcode the payload to an AMR-WB payload, to provide RTP packet 420.

In the examples of operations 412 and 418, the packet received by ATGW 402 (e.g., packet 410 or 416, respectively) is associated with a sending media capability, e.g., a specific codec. The packet transmitted by ATGW 402 (packet 414 or 420, respectively) is associated with a receiving media capability different from the sending media capability, e.g., a different codec.

In some examples, operation 404 performed by ATCF 312 can include communicating with ATGW 402. In some examples, at operation 404, when the SIP 183 or other response is received from Terminal B 304, the ATCF 312 sends the received SDP or other information of media capabilities to ATGW 402. At operation 422, ATGW 402 validates the SDP or other information of media capabilities. ATGW 402 can, for example, filter or modify the SDP or other information, so that only media capabilities supported by the ATGW 402 (e.g., transcoding between AMR-WB and EVS ChAw) are included. ATGW 402 then provides the updated SDP or other information to ATCF 312. ATCF 312 can then send response 406 to O-IMS 308.

In some examples, anchoring network device 106 can be configured to interact with network gateway 130 as part of at least one of operation 314 or operation 404, e.g., of only one of those or of both of those. In some examples, a network gateway 130 can be configured to perform processing of at least one of operation 326 or operation 422, e.g., of only one of those or of both of those. In some examples, anchoring network device 106 can be configured to perform processing without interacting with network gateway 130 as part of at least one of operation 314 or operation 404, e.g., only one of those or both of those. In some examples, network gateway 130 can be configured to perform only one of operations 326 or 422, both of those, or neither of those.

Figure 5:
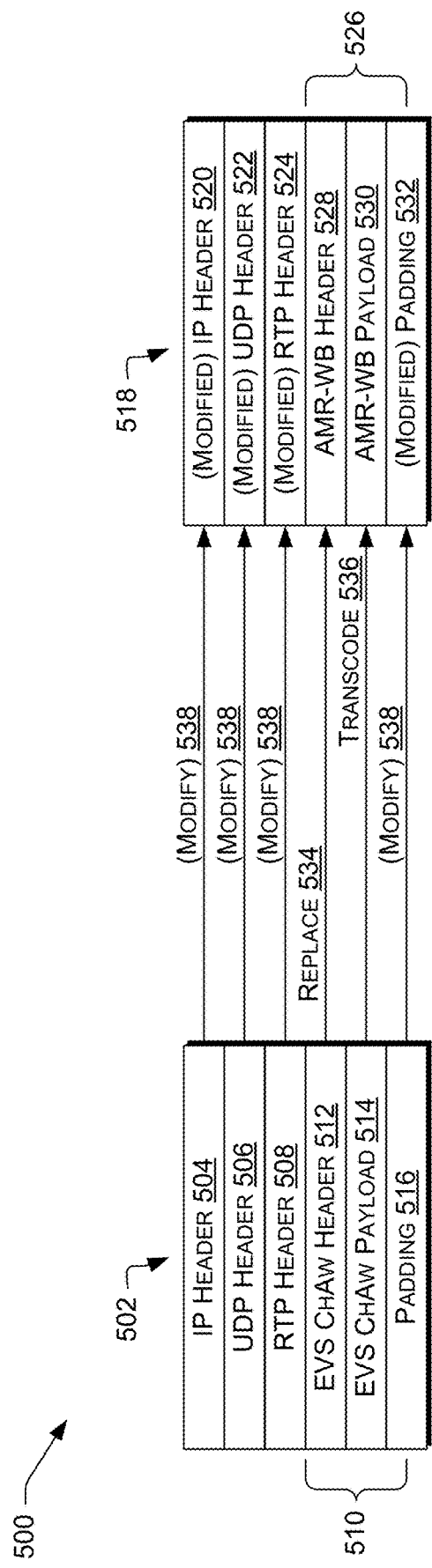
FIG. 5 shows an example of packets before and after processing as described with reference to FIG. 4.

FIG. 5 shows an example 500 of packets before and after processing at block 408, FIG. 4. Operations of example 500 can be performed, e.g., by ATGW 402 or another network gateway. Operations of example 500 can be applied to at least one packet with any destination, e.g., to both operations 412 and 418, FIG. 4. Example 500 is shown in the context of IP, UDP, SIP, SDP, EVS ChAw mode, and AMR-WB, but none of these is limiting.

Packet 502 represents a packet received for processing, e.g., packets 410 or 416, FIG. 4. Packet 502 includes, in order of transmission, IP header 504, UDP header 506, and RTP header 508. An RTP payload section 510 includes EVS ChAw mode header 512 and payload 514. Payload 514 may be followed by padding 516, e.g., as part of the RTP payload section 510 or after the RTP payload section 510.

Packet 518 represents a processed packet, e.g., packets 414 or 420, FIG. 4. Packet 518 includes, in order of transmission, IP header 520, UDP header 522, and RTP header 524. An RTP payload section 526 includes AMR-WB header 528 and AMR-WB payload 530. Payload 530 may be followed by padding 532, e.g., as part of the RTP payload section 526 or after the RTP payload section 526.

In some examples, block 408 can include operation 534 of replacing EVS ChAw mode header 512 in packet 502 with AMR-WB header 528 to determine packet 518. Operation 534 can include determining AMR-WB header 528 based at least in part on EVS ChAw mode header 512. For example, operation 534 can include determining AMR-WB header 528 including a four-bit codec mode request (CMR) field (RFC 4867, § 4.3.1) corresponding to a bit rate of at least the 13.2-kbit/s bit rate of EVS ChAw mode, as indicated by header 512.

In some examples, block 408 can include operation 536 of transcoding payload 514 from packet 502 to provide payload 530 for inclusion in packet 518. Operation 536 can provide interoperability between EVS and non-EVS codecs, for example.

In some examples, block 408 can include operation(s) 538 of modifying other headers or portions of a packet in response to changes introduced by operation 534. For example, operation 534 may result in the RTP payload section 526 having a different size than the RTP payload section 510. This change in size may require changes to packet-size fields in other headers, or may require changes to the number of bits of padding 532 required. Therefore, operation 538 can include determining IP header 520 based at least in part on IP header 504, e.g., by copying or modifying IP header 504 as necessary for protocol compliance in view of the changes introduced by operation 534. Operation 538 can additionally or alternatively include likewise determining UDP header 522 based at least in part on UDP header 506, RTP header 524 based at least in part on RTP header 508, or padding 532 based at least in part on padding 516. In the figure, the indications "(Modify)" and "(Modified)" represent the fact that modifications may or may not be required for any particular portion of any particular packet, depending on the effects of operation 534 and the specific requirements and data formats of the codecs and protocols involved.

Figure 6A:
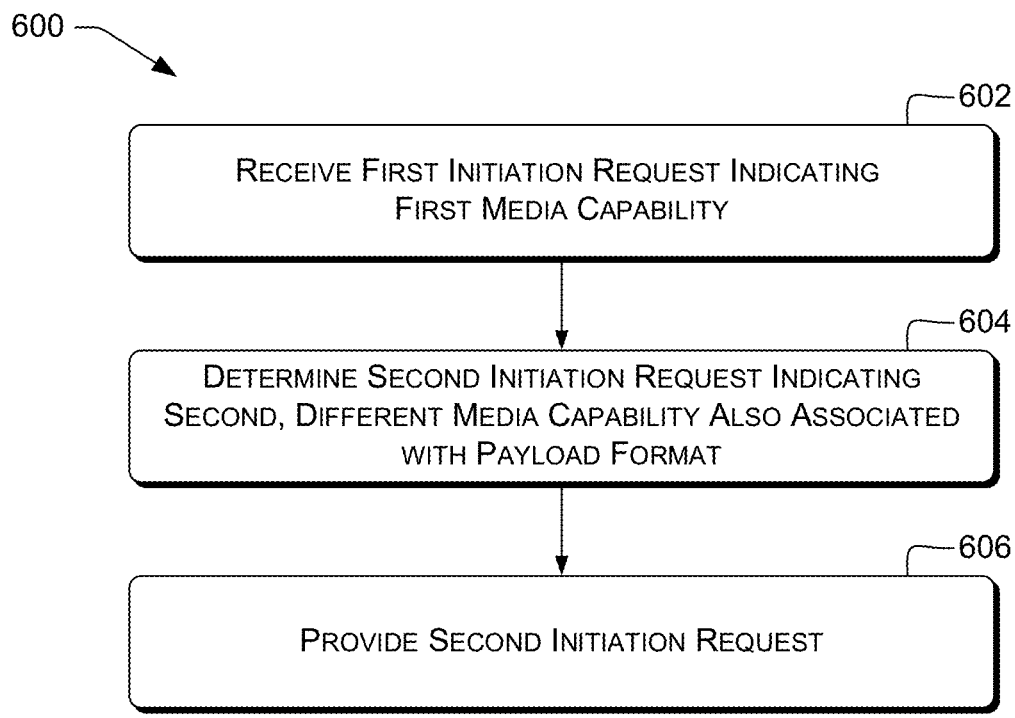
FIG. 6A illustrates an example process for interworking between two terminals during establishment of a communication session according to some implementations. Illustrated operations can be performed by an anchoring network device, in some examples.
Figure 6B:
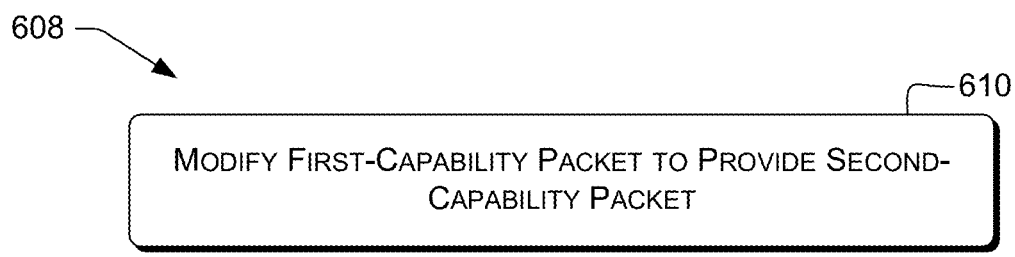
FIG. 6B illustrates an example process for interworking between two terminals during an established phase of a communication session according to some implementations. Illustrated operations can be performed by a network gateway, in some examples.

FIGS. 6A and 6B illustrate example processes for interworking between two terminals, e.g., terminals 302 and 304. The illustrated processes can be carried out by an anchoring network device 106 and a network gateway 130 of a telecommunication system 100. The processes of FIGS. 6A and 6B can be carried out separately or in a coordinated manner Referring to FIG. 6A, process 600 can be performed by an anchoring network device 106, e.g., ATCF 312. In some examples, the anchoring network device can include one or more processors configured to perform operations described below (or in FIG. 7, 9, 10, or 11), e.g., in response to computer program instructions of the offer-processing module 232.

Operations shown in FIGS. 6A-6B and in FIGS. 7-11, discussed below, can be performed in any order except when otherwise specified, or when data from an earlier step is used in a later step. For clarity of explanation, reference is herein made to various components shown in FIGS. 1-5 that can carry out or participate in the steps of the exemplary method. It should be noted, however, that other components can be used; that is, exemplary method(s) shown in FIGS. 6A-11 are not limited to being carried out by the identified components.

In some examples, at block 602, anchoring network device 106 can receive, from a calling terminal 302, a first initiation request 306 of a communication session, e.g., a SIP INVITE. The anchoring network device 106 can receive the first initiation request 306 directly from the calling terminal 302, or via at least one intervening device, e.g., of access network 108 or another network. Similarly, throughout the discussion of FIGS. 6A-11, discussions of transmissions from specified origins or to specified destinations can include any number, zero or more, of intervening network devices.

The first initiation request 306 can indicate a first media capability, e.g., a codec such as AMR-WB (e.g., in the example of FIG. 3). The first media capability can be indicated, e.g., in an SDP body of the SIP INVITE as discussed above. The first initiation request 306 can also indicate a called terminal, e.g., by hostname or address. For example, the called terminal can be indicated in a SIP "To" header.

In some examples, at block 604, anchoring network device 106 can determine a second initiation request 316 based at least in part on the first initiation request 306. The second initiation request 316 can indicate a second media capability different from the first media capability. In the example of FIG. 3, the second media capability is EVS ChAw mode. In some examples, the first media capability and the second media capability can include respective, different signal-integrity techniques, e.g., different error-correction codes, buffering and data-loss-mitigation techniques, flow-control techniques, or error-detection techniques. The first media capability and the second media capability can be respective, different codecs that share a common payload format (e.g., AMR-WB and EVS IO mode), that have respective, different signal-integrity techniques (e.g., EVS ChAw mode and EVS standard mode), or that differ in other ways. Examples are discussed above, e.g., with reference to block 314 or responses 320 or 322.

In some examples, anchoring network device 106 can determine the second initiation request 316 further based at least in part on a type of the called terminal. For example, if the called party is a PSTN (circuit switched) phone, the called terminal will be a media gateway (MGW) configured to proxy between SIP signaling and RTP media, on the packet-switched network, and SS7 signaling and PCM media, on the circuit-switched network. The anchoring network device 106 can determine that the called terminal is of a type that is not capable of supporting EVS, for example, and so can determine the second initiation request 316 excluding the second media capability, or including only a subset of media capabilities. Additionally or alternatively, the anchoring network device 106 can determine the second media capability in accordance with a type of the called terminal, e.g., PCMU audio (8-bit, 8 kHz, µ-law PCM) for a PSTN MGW called terminal.

In some examples, at block 606, anchoring network device 106 can provide the second initiation request 316 to a called terminal 304. Block 606 can include providing the second initiation request 316 to the called terminal 304, e.g., directly, or via an S-CSCF, SCC AS, or other network device(s), as noted above.

FIG. 6B illustrates an example process 608 for interworking between two terminals, e.g., terminals 302 and 304. Process 608 can be performed by a network gateway 130, e.g., ATGW 402. In some examples, the network gateway 130 can include one or more processors configured to perform operations described below (or in FIG. 8), e.g., in response to computer program instructions of the packet-processing module 234.

In some examples, at block 610, network gateway 130 can modify a first packet associated with the first media capability, e.g., packet 410 or 416, to provide a second packet associated with the second media capability, e.g., packet 414 or 420, respectively. The network gateway 130 can apply session information 134 or rewrite rules 236 to select the first packet for modification, or to determine modification(s) to be made to the first packet. For example, block 610 can include changing, adding, deleting, or replacing codec header(s), RTP header(s), or other protocol header(s). Block 610 can additionally or alternatively include transcoding payload(s), e.g., transcoding payload 514 to provide payload 530. In some examples, the first packet can be a packet received from a sending terminal. The sending terminal can be the calling terminal 302 or the called terminal 304.

In some examples, the first packet is associated with a sending media capability (e.g., AMR-WB or PCM). The second packet is associated with a receiving media capability (e.g., EVS ChAw mode). In some examples, e.g., EVS IO mode and AMR-WB, the first packet and the second packet are associated with the payload format (e.g., an AMR-WB core frame). In some examples, the first packet and the second packet are associated with respective, different payload formats. The sending media capability can be one, and the receiving media capability the other, of the first media capability and the second media capability discussed above with reference to blocks 602 and 604. Using different media capabilities associated with a common payload format can permit interworking with reduced computational burden or delay. Using different media capabilities with respective payload formats can permit interworking within a wider range of devices.

Figure 7:
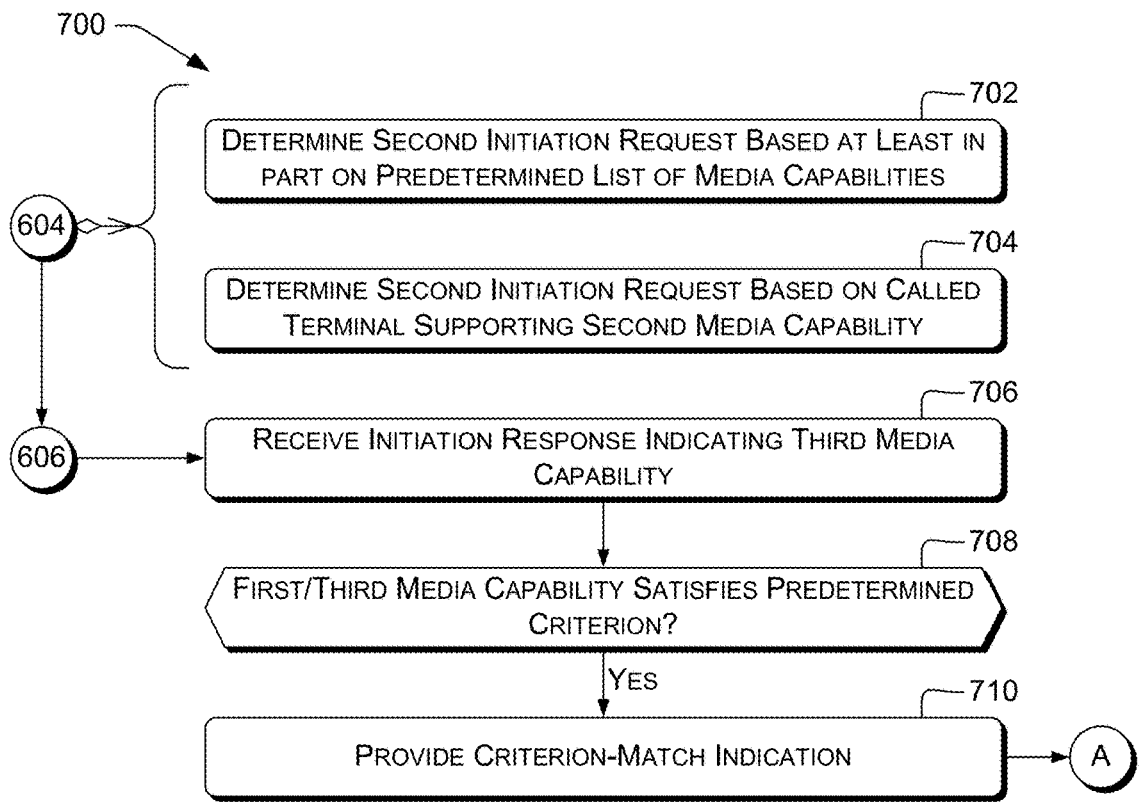
FIG. 7 illustrates an example process for interworking between two terminals during establishment of a communication session according to some implementations. Illustrated operations can be performed by an anchoring network device, in some examples.

FIG. 7 illustrates an example process 700 for interworking between two terminals 302 and 304. Process 700 can be can be performed by an anchoring network device 106, e.g., ATCF 312. In some examples, block 604 can include block 702 or block 704. In some examples, block 606 can be followed by block 706.

In some examples, at block 702, the anchoring network device 106 can determine the second initiation request 316 based at least in part on a predetermined list of acceptable media capabilities. For example, an operator of network 206 can define a set of requirements. Media capabilities not meeting those requirements can be removed from the first initiation request 306 to form the second initiation request 316. Information of the requirements can be stored, e.g., in the rewrite rules 236.

In some examples, at block 704, the anchoring network device 106 can determine that the called terminal, e.g., terminal 304, supports the second media capability. For example, the anchoring network device 106 can communicate with an HLR/HSS to determine terminal information associated with a current IMS subscription of the called terminal. The anchoring network device 106 can then determine the second initiation request including the second media capability if the called terminal supports the second media capability, and omitting the second media capability otherwise.

In some examples, at block 706, the anchoring network device 106 can receive an initiation response that is associated with the second initiation request 316, e.g., a SIP 183 response such as response 320. The initiation response 320 can indicate a third media capability. The third media capability may match or differ from at least one of the first media capability or the second media capability.

In some examples, at block 708, the anchoring network device 106 can determine that at least one of the first media capability and the third media capability satisfies a predetermined criterion, e.g., stored in the rewrite rules 236. For example, the predetermined criterion can be that the first media capability be the AMR-WB codec and the third media capability be the EVS ChAw mode codec.

In some examples, at block 710, in response to the determination at block 708, the anchoring network device 106 can provide a criterion-match indication. In some examples, the anchoring network device 106 can store the criterion-match indication in the session information 134. As depicted by connector A, block 808 can be performed by the network gateway 130 in response to the criterion-match indication provided at block 710.

Figure 8:
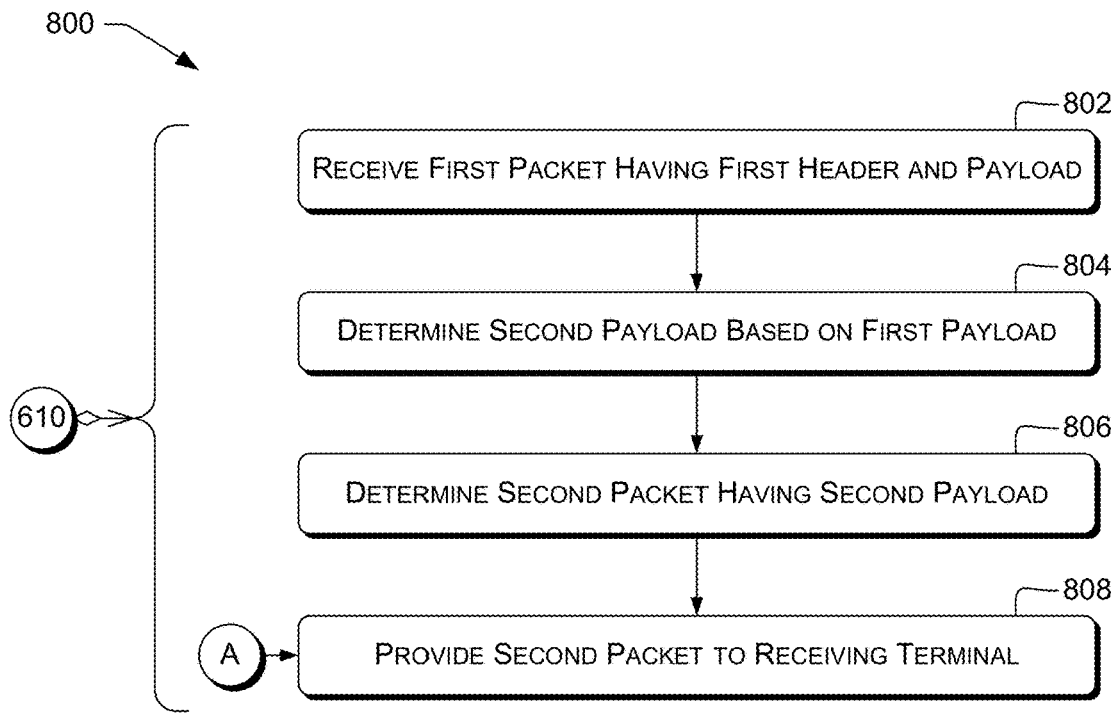
FIG. 8 illustrates an example process for interworking between two terminals during an established phase of a communication session according to some implementations. Illustrated operations can be performed by a network gateway, in some examples.

FIG. 8 illustrates an example process 800 for interworking between two terminals 302 and 304. Process 800 can be can be performed by a network gateway 130, e.g., ATGW 402. In some examples, block 610 can include blocks 802-808.

In some examples, at block 802, the network gateway 130 can receive the first packet from the sending terminal. The first packet can include a first header, e.g., header 512, and a first payload, e.g., payload 514. The first payload can be associated with the sending media capability described herein with reference to block 610.

In some examples, at block 804, the network gateway 130 can determine a second payload based at least in part on the first payload. Examples are discussed herein, e.g., with reference to operation 534, FIG. 5. The second payload can be associated with the second media capability. For example, the network gateway 130 can transcode the first payload 514 to provide the second payload 530.

In some examples, at block 806, the network gateway 130 can determine the second packet including the second payload, e.g., payload 530. In some examples, the payload remains unchanged and only the headers are changed, although this is not required. In some of these examples, block 806 can include determining the second packet consisting of at least one header and the first payload.

In some examples, at block 808, the network gateway 130 can provide the second packet to a receiving terminal of the calling terminal and the called terminal. The receiving terminal can be a different terminal from the sending terminal, within the bounds of the information available to the network gateway 130. For example, the second packet can be transmitted to a different network address than a source network address of the first packet. Block 808 can follow block 806, or can be used independently of block 806.

In some examples, the network gateway 130 can provide the second packet (block 808) in response to the criterion-match indication determined at block 710, FIG. 7. For example, the network gateway 130 can retrieve the criterion-match indication from the session information 134. Network gateway 130 can then provide the second packet, e.g., by performing processing of block 610, for communication sessions that match the criteria described herein with reference to block 708. This can reduce computational load on the network gateway 130 by removing the need to check inner packet headers (e.g., UDP ports or RTP payload types) if no communication session requiring header rewriting is active for a particular source or destination address.

In some examples, network gateway 130 can be configured to receive a rewrite indication via network 206. Examples are discussed herein, e.g., with reference to block 1012. The rewrite indication can indicate a communication session. The network gateway 130 can receive, via the network, a first packet associated with the communication session and including a first payload associated with a first media capability. Examples are discussed herein, e.g., with reference to packets 410 or 416. The network gateway 130 can transcode the first payload to provide a second payload associated with a second, different media capability, and determine a second packet based at least in part on the first packet and including the second payload. Examples are discussed herein, e.g., with reference to block 408 and FIG. 5. The network gateway 130 can then transmit, via the network, the second packet. Examples are discussed herein, e.g., with reference to packets 414 and 420. A network gateway 130 configured to perform these functions can be part of a telecommunication system, e.g., that also includes an anchoring network device as described herein.

In some examples, the network gateway 130 can be configured to modify packets only in one direction of a communication session (e.g., terminal 302 to terminal 304 or vice versa), or to modify packets in both directions of a communication session. In some examples, a network gateway 130 can include hardware or processing resources for processing one packet at a time, or more than one packet at a time. In some examples, the first media capability and the second media capability have respective Multipurpose Internet Mail Extensions (MIME) types with the same type but different subtypes, e.g., audio/EVS and audio/AMR-WB. In some examples, the first and second media capabilities have different media types, e.g., audio and video respectively. In some examples, the network gateway 130 can be configured to modifying packets or headers associated with commonality between two media capabilities, e.g., to only modify audio headers associated with an audio/video first media capability if the second media capability is an audio-only media capability.

Figure 9:
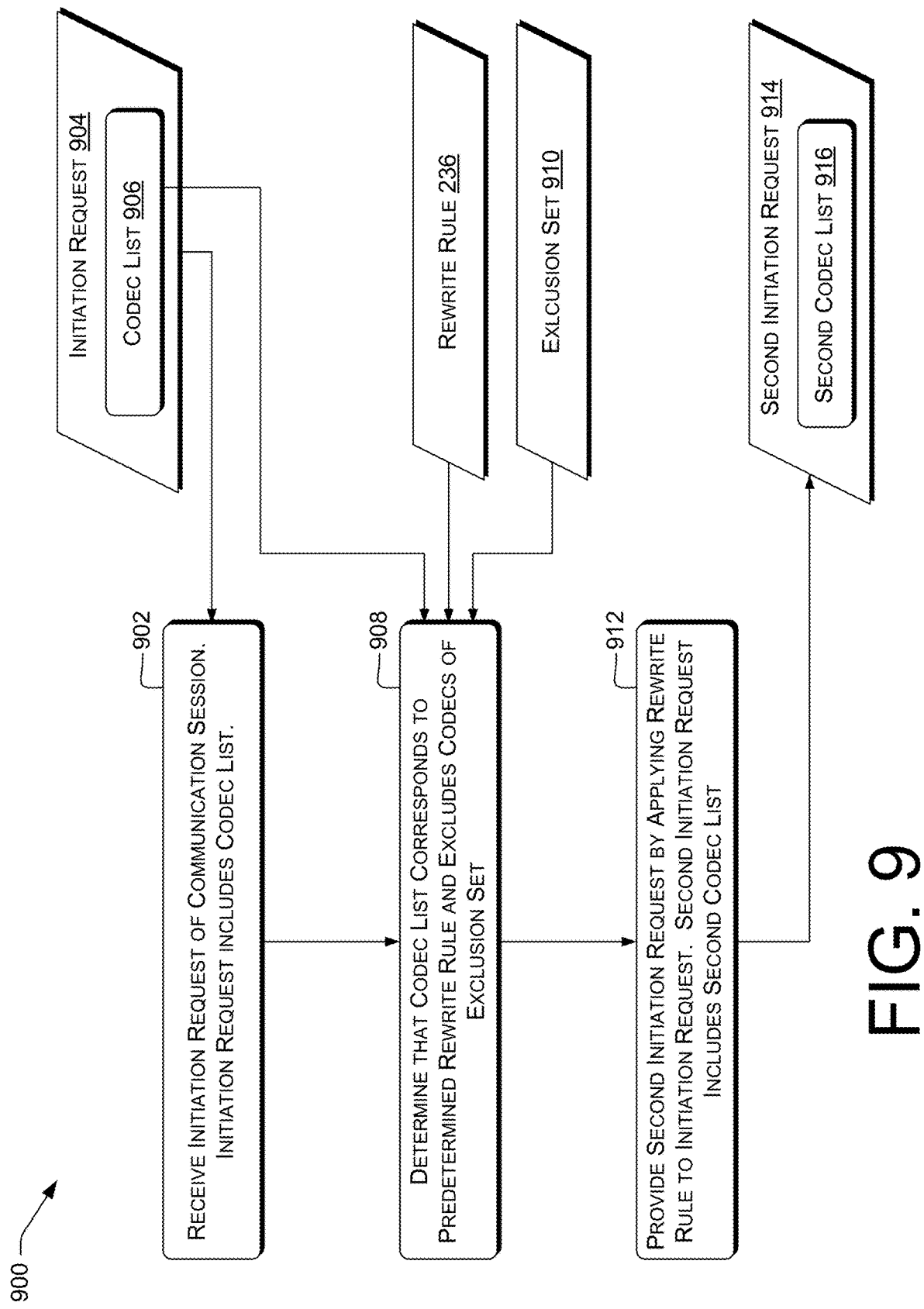
FIG. 9 illustrates an example process, and related dataflow, for interworking between two terminals and modifying an initiation request during establishment of a communication session according to some implementations.

FIG. 9 illustrates an example process 900 for interworking between two terminals 302, 304, and related dataflow. Process 900 can be performed by an anchoring network device 106, e.g., ATCF 312.

In some examples, at block 902, the anchoring network device 106 can receive an initiation request 904 of a communication session, e.g., via a network such as network 206. Initiation request 904 can represent initiation request 306, FIG. 3, and can be transmitted by or on behalf of a calling terminal. Examples are discussed above, e.g., with reference to block 602. Initiation request 904 can include a codec list 906, e.g., specifying codecs usable by the calling terminal.

In some examples, at block 908, the anchoring network device 106 can determine that the codec list 906 of the initiation request 904 corresponds to a predetermined rewrite rule 236 (or multiple rewrite rules 236, and likewise throughout the document). The anchoring network device 106 can also determine that the codec list 906 excludes codecs of a predetermined exclusion list 910. As used herein, a "list" can have one element or can have more than one element.

The codec list 906 can include at least one codec and can include a first codec, e.g., AMR-WB or EVS ChAw mode. Examples are discussed above, e.g., with reference to block 604. The rewrite rule 236 can specify alterations to the first codec in the codec list or other codecs. The rewrite rule 236 can be conditioned on a match between the codec list and at least one criterion specified in the rewrite rule. Instead of or in addition to a codec list 906, a rewrite rule 236 can be used to test or can be applied to a capability list (omitted for brevity) of at least one media capability (and likewise throughout the document).

In some examples, at block 912, the anchoring network device 106 can apply the rewrite rule 236 to the initiation request 904 to provide a second initiation request 914 having a second codec list 916 (or second capability list, and likewise throughout the document) including a second, different codec. Second initiation request 914 can represent second initiation request 316. The first codec and the second codec can both be associated with a common payload format, although this is not required. In some examples, the first codec and the second codec are associated with respective, different payload formats. Examples are discussed above, e.g., with reference to block 604. In the example of FIGS. 3 and 4, the first codec list 906 includes AMR-WB and the second codec list 916 includes EVS ChAw mode.

Using exclusion list 910 can permit effectively selecting codecs across various types of communication sessions to provide improved performance. For example, EVS ChAw mode can provide improved audio quality in high-loss environments such as when a terminal 304 is at the cell edge. EVS IO mode can provide reduced load on core network components because its payload format corresponds to the payload format of AMR-WB. Therefore, EVS IO mode terminals can intercommunicate with AMR-WB terminals without transcoding. Including EVS in the exclusion list 910, in some examples, can permit the calling terminal 302 to select a range of codecs for effective intercommunication with terminal 302, while still permitting the network gateway 130 and called terminal 304 to select codecs that permit effective communication with terminal 304 given its radio environment when a session is initiated. Some examples not using an exclusion list 910, on the other hand, permit selecting codecs (or other media capabilities) that permit network gateway 130 and called terminal 304 to effectively intercommunicate, even if those codecs are not supported by the calling terminal 302.

Moreover, in some examples, enabling EVS ChAw mode at the beginning of a session permits enabling and disabling some of the overhead of EVS ChAw mode during a session, e.g., by setting ch-aw-recv=0 to disable ChAw mode or ch-aw-recv=2, 3, 5, or 7 to enable ChAw mode. This can improve robustness when necessary without unduly burdening the access network 104, e.g., when called terminal 304 moves into a better-coverage area. EVS ChAw mode can permit improvements in call quality in both directions, since both the ATGW 402 and called terminal 304 can buffer and reconstruct lost packets, in some examples. Therefore, EVS ChAw mode can provide improved voice quality, even in the face of packet loss or low signal strength.

Figure 10:
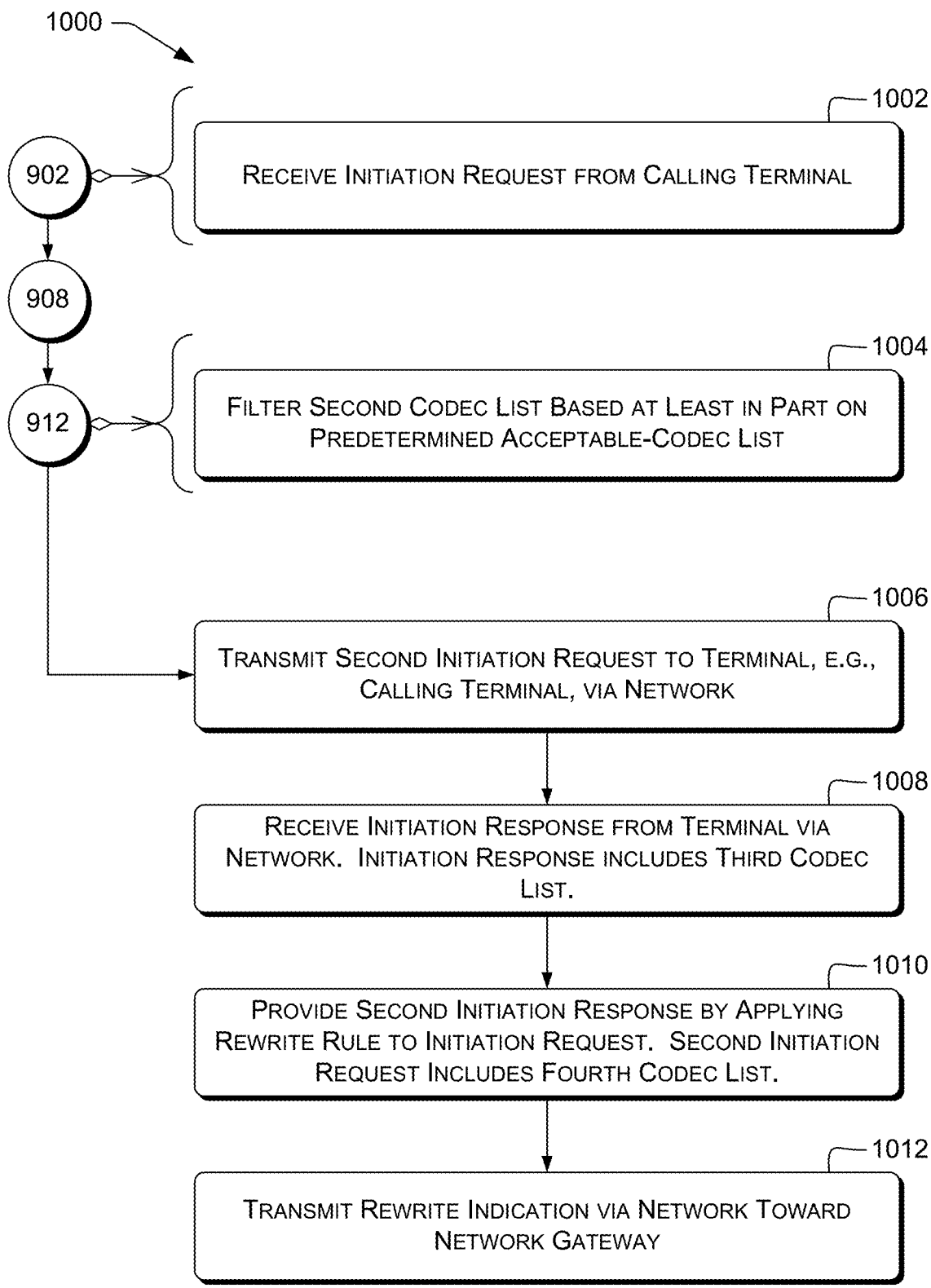
FIG. 10 illustrates an example process for interworking between two terminals during establishment of a communication session according to some implementations.

FIG. 10 illustrates an example process 1000 for interworking between two terminals 302, 304. Process 1000 can be performed by an anchoring network device 106, e.g., ATCF 312. Block 902 can include block 1002. Block 912 can include block 1004. Block 912 can be followed by block 1006.

In some examples, at block 1002, the anchoring network device 106 can receive the initiation request 904 from a calling terminal, e.g., terminal 302. Block 1002 can be used with block 1006, below.

In some examples, at block 1004, the anchoring network device 106 can filter the second codec list 916 discussed above with reference to block 912. Block 1004 can include filtering based on a predetermined acceptable-codec list. For example, if a network does not support the use of particular codecs, such as G.711 uncompressed audio, those codecs can be removed or omitted from the second codec list 916 of the second initiation request 914. This can provide increased network control of bandwidth usage, and can reduce the probability of call failures due to use of codecs incompatible with core network device(s) such as media gateways.

In some examples, at block 1006, the anchoring network device 106 can transmit the second initiation request 914 via the network to (towards) a terminal, e.g., terminal 304. In some examples, e.g., examples using block 1002, the anchoring network device 106 can transmit the second initiation request 914 to the calling terminal.

In some examples, at block 1008, the anchoring network device 106 can receive an initiation response from the called terminal via the network. The initiation response, e.g., response 320 or 322, can include, e.g., a SIP 183 response. The initiation response can include a third codec list, e.g., an SDP body, having a third codec, e.g., EVS ChAw mode.

In some examples, at block 1010, the anchoring network device 106 can apply a second predetermined rewrite rule to the third codec list to provide a second initiation response including a fourth codec list having a fourth codec different from the third codec. The third codec and the fourth codec can both be associated with the common payload format, or can be associated with respective, different payload formats, in some examples. In some examples, block 1010 can include filtering the fourth codec list based on a predetermined acceptable-codec list, e.g., as discussed herein with reference to block 1004. In some examples, if the second initiation request 914 includes EVS ChAw mode but the first initiation request 904 does not, the anchoring network device 106 can remove EVS ChAw mode from the third codec list to provide the fourth codec list. The fourth codec can include, e.g., EVS standard mode or AMR-WB. In this way, the calling terminal 302 can remain unaware that a change of format is occurring at the network gateway 130. This can permit interoperation between, e.g., older and newer cellular terminals, with improved lost-packet resistance (e.g., provided by EVS ChAw mode) compared to some prior codecs.

In some examples, at block 1012, the anchoring network device 106 can transmit a rewrite indication via a network to a network gateway. The rewrite indication can be, include, or be included in session information 134. The rewrite indication is further discussed above with reference to block 404, FIG. 4.

Figure 11:
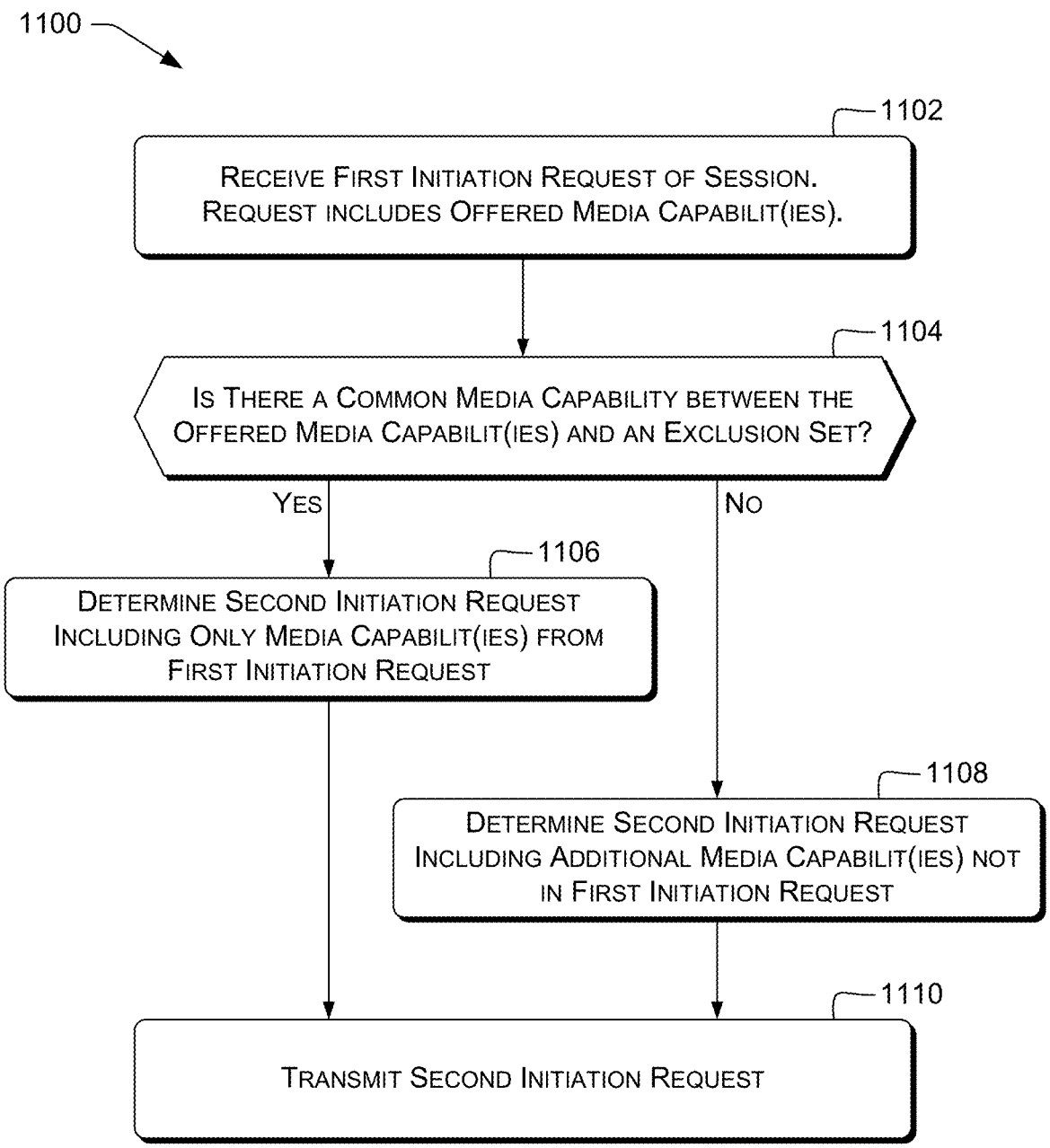
FIG. 11 illustrates an example process for interworking between two terminals during establishment of a communication session according to some implementations.

FIG. 11 illustrates an example process 1100 for interworking between two terminals 302, 304. Process 1100 can be performed by an anchoring network device 106, In some examples, at block 1102, the anchoring network device 106 can receive a first initiation request 306 of a communication session via a communications interface. For example, the anchoring network device 106 can receive the first initiation request 306 from a calling terminal, e.g., terminal 302. The first initiation request 306 can indicate at least one offered media capability. Examples are discussed herein, e.g., with reference to block 602.

In some examples, at block 1104, the anchoring network device 106 can determine if there is a common media capability between the at least one offered media capability of the first initiation request 306 and a predetermined exclusion list, e.g., list 910, FIG. 9, comprising at least one exclusion media capability. If so, the common media capability (or capabilities) is a capability that is listed in both the at least one offered media capability and the predetermined exclusion list. The media capabilities can include codecs, error-correction techniques, or other capabilities described herein. In some examples, the predetermined exclusion list can include or consist of an additional media capability or capabilities. In some examples, the predetermined exclusion list can include or consist of any number of media capabilit(ies). If there is a common media capability, block 1104 can be followed by block 1106; if not, block 1104 can be followed by block 1108.

In some examples, at block 1106, in response to a determination that there is a common media capability, the anchoring network device 106 can determine a second initiation request 316 based at least in part on the first initiation request 306. Each of a plurality of second media capabilities indicated in the second initiation request 316 can also be indicated in the first initiation request 306. For example, if there is a common media capability (e.g., EVS), the at least one offered media capability can be passed unmodified, or can be filtered only by removal—not by addition—of media capabilit(ies). Examples are discussed herein, e.g., with reference to FIG. 9. Block 1106 can be followed by block 1110.

In some examples, at block 1108, in response to a determination that there is not a common media capability, the anchoring network device 106 can determine the second initiation request 316 based at least in part on the first initiation request 306. The second initiation request can indicate an additional media capability that is not indicated in the first initiation request 306. For example, if there is no common media capability (e.g., the first initiation request 306 does not include EVS), the at least one offered media capability can be supplemented with the additional media capability (e.g., EVS ChAw mode) in order to provide the second initiation request 306. Examples are discussed herein, e.g., with reference to FIG. 9. The additional media capability can be included in the exclusion list, or not, in some examples.

In some examples, at block 1108, the anchoring network device 106 can determining the second initiation request 316 further indicating a second additional media capability that is not indicated in the first initiation request 306. The additional media capability can be a capability that requires the second additional media capability, e.g., that must be used in conjunction with the second additional media capability in order to provide desired or full functionality.

For example, to transmit audio of a telephone call between two terminals, a connection can be established between those two terminals and data encoded using EVS can be transmitted. For full functionality of the phone call, including, e.g., DTMF digits, the EVS codec generally requires that another connection be established between those devices carrying a tel-event stream at 16 kHz ("tel-event 16" in FIGS. 3 and 4). In this example, the additional media capability of EVS, e.g., EVS ChAw mode, requires the second additional media capability of tel-event 16. Examples are discussed herein, e.g., with reference to initiation response 320. In some examples, the additional media capability comprises EVS ChAw codec and the second additional media capability comprises a telephone-event codec having a sampling rate greater than eight kHz. In some examples, tel-event 16 can be added even if tel-event 8 is already present; in other examples, tel-event 16 can replace any present tel-event 8 (and likewise for other media capabilities having varying parameters).

In some examples, at block 1110, the anchoring network device 106 can transmit the second initiation request 316 via the communications interface. Examples are discussed herein, e.g., with reference to block 314. In some examples, block 1110 can include transmitting the second initiation request 316 to a called terminal, e.g., terminal 304. Examples are discussed herein, e.g., with reference to block 606.

EXAMPLE CLAUSES

A: A telecommunication system, comprising: an anchoring network device configured to: receive, from a calling terminal, a first initiation request of a communication session, the first initiation request indicating: a first media capability; and a called terminal; determine a second initiation request based at least in part on the first initiation request, the second initiation request indicating a second media capability different from the first media capability; and provide the second initiation request to the called terminal; and a network gateway configured to modify a first packet from a sending terminal of the origin terminal and the destination terminal to provide a second packet, wherein: the first packet is associated with a sending media capability; the second packet is associated with a receiving media capability; and the sending media capability is one, and the receiving media capability the other, of the first media capability and the second media capability.

B: The telecommunication system according to paragraph A, wherein the network gateway is further configured to provide the second packet to a receiving terminal of the calling terminal and the called terminal, wherein the receiving terminal is different from the sending terminal.

C: The telecommunication system according to paragraph A or B, wherein the network gateway is further configured to: receive the first packet from the sending terminal, wherein the first packet comprises a first payload associated with the sending media capability; determine a second payload based at least in part on the first payload, wherein the second payload is associated with the second media capability; and determine the second packet comprising the second payload.

D: The telecommunication system according to any of paragraphs A-C, wherein: the anchoring network device is further configured to: receive an initiation response that is associated with the second initiation request and that indicates a third media capability; determine that at least one of the first media capability and the third media capability satisfies a predetermined criterion; and provide a criterion-match indication; and the network gateway is configured to provide the second packet in response to the criterion-match indication.

E: The telecommunication system according to any of paragraphs A-D, wherein the anchoring network device includes an Access Transfer Control Function (ATCF) and the network gateway includes an Access Transfer Gateway (ATGW).

F: The telecommunication system according to any of paragraphs A-E, wherein the initiation request includes a Session Initiation Protocol (SIP) INVITE message having a Session Description Protocol (SDP) body indicating the first media capability.

G: The telecommunication system according to paragraph F, wherein the first media capability and the second media capability include respective, different signal-integrity techniques.

H: The telecommunication system according to any of paragraphs A-G, wherein: the first media capability comprises at least one of an Adaptive Multi-Rate (AMR) audio codec or a Pulse Code Modulated (PCM) audio codec; and the second media capability comprises an Enhanced Voice Services (EVS) Channel-Aware-mode (ChAw) codec.

I: The telecommunication system according to any of paragraphs A-H, wherein the anchoring network device is further configured to determine the second initiation request based at least in part on a predetermined list of acceptable media capabilities.

J: The telecommunication system according to any of paragraphs A-I, wherein the anchoring network device is further configured to: determine that the called terminal supports the second media capability; and, in response, determine the second initiation request.

K: The telecommunication system according to any of paragraphs A-J, wherein the anchoring network device is further configured to determine the second initiation request based at least in part on a type of the called terminal.

L: A method, comprising: receiving an initiation request of a communication session via a network; determining that a codec list of the initiation request corresponds to a predetermined rewrite rule, wherein the codec list includes a first codec and excludes codecs of a predetermined exclusion list; and applying the rewrite rule to the initiation request to provide a second initiation request having a second codec list including a second, different codec.

M: The method according to paragraph L, further comprising filtering the second codec list based on a predetermined acceptable-codec list.

N: The method according to paragraph L or M, further comprising transmitting the second initiation request via the network to a called terminal.

O: The method according to paragraph N, further comprising: receiving an initiation response from the called terminal via the network, the initiation response including a third codec list having a third codec; applying a second predetermined rewrite rule to the third codec list to provide a second initiation response including a fourth codec list having a fourth codec different from the third codec.

P: The method according to paragraph O, wherein the initiation request and the second initiation request comprise respective SIP INVITE requests and the initiation response and the second initiation response comprise respective SIP Provisional responses.

Q: The method according to paragraph O or P, further comprising filtering the fourth codec list based on a predetermined acceptable-codec list.

R: The method according to any of paragraphs O-Q, further comprising receiving the initiation request from a calling terminal and transmitting the second initiation response via the network to the calling terminal.

S: The method according to any of paragraphs L-R, further comprising transmitting a rewrite indication via a network to a network gateway.

T: An anchoring network device comprising: a communications interface; a processor; and a memory storing instructions that, when executed by the at least one processor, cause the at least one processor to perform operations comprising: receiving a first initiation request of a communication session via the communications interface, wherein the first initiation request indicates at least one offered media capability; determining if there is a common media capability between the first initiation request and a predetermined exclusion list comprising at least one exclusion media capability; in response to a determination that there is a common media capability, determining a second initiation request based at least in part on the first initiation request, wherein each of a plurality of second media capabilities indicated in the second initiation request is also indicated in the first initiation request; in response to a determination that there is not a common media capability, determining the second initiation request based at least in part on the first initiation request, wherein the second initiation request indicates an additional media capability that is not indicated in the first initiation request; and transmitting the second initiation request via the communications interface.

U: The anchoring network device according to paragraph T, wherein the operations further comprise receiving the first initiation request from a calling terminal and transmitting the second initiation request to a called terminal.

V: The anchoring network device according to paragraph T or U, wherein the predetermined exclusion list comprises the additional media capability.

W: The anchoring network device according to any of paragraphs T-V, wherein: the operations further comprise, in response to a determination that there is not a common media capability, determining the second initiation request further indicating a second additional media capability that is not indicated in the first initiation request; and the additional media capability requires the second additional media capability.

X: The anchoring network device according to paragraph W, wherein: the additional media capability comprises an Enhanced Voice Services (EVS) Channel-Aware-mode (ChAw) codec; and the second additional media capability comprises a telephone-event codec having a sampling rate greater than eight kHz.

Y: The anchoring network device according to any of paragraphs T-X, wherein the additional media capability comprises an Enhanced Voice Services (EVS) Channel-Aware-mode (ChAw) codec.

Z: A network gateway configured to: receive a rewrite indication via a network, the rewrite indication indicating a communication session; receive, via the network, a first packet associated with the communication session and including a first payload associated with a first media capability; transcode the first payload to provide a second payload associated with a second, different media capability; determine a second packet based at least in part on the first packet and including the second payload; and transmit, via the network, the second packet.

AA: A network gateway as in paragraph Z, further configured to (e.g., before or concurrently with receiving the rewrite indication): receive an offer, e.g., via a network (e.g., from an anchoring network device), wherein the offer indicates at least one media capability; filter or validate the at least one media capability to provide an updated offer (e.g., including only media capabilities supported by the capability or configuration of the network gateway); and transmit the updated offer, e.g., via the network (e.g., to the anchoring network device).

AB: A telecommunication system comprising: at least one anchoring network device as recited in any of paragraphs A-Y; and at least one network gateway as recited in paragraphs Z or AA.

AC: A computer-readable medium, e.g., a computer storage medium, having thereon computer-executable instructions, the computer-executable instructions upon execution configuring a computer to perform operations as recited in any of paragraphs A-AA.

AD: A device comprising: a processor; and a computer-readable medium, e.g., a computer storage medium, having thereon computer-executable instructions, the computer-executable instructions upon execution by the processor configuring the device to perform operations as recited in any of paragraphs A-AA.

AE: A system comprising: means for processing; and means for storing having thereon computer-executable instructions, the computer-executable instructions including means to configure the system to carry out a method as recited in any of paragraphs A-AA.

Conclusion

In the figures, example data transmissions (parallelograms), example data exchanges in call flow diagrams, and example blocks in process diagrams represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the transmissions are described is not intended to be construed as a limitation, and any number of the described transmissions can be combined in any order and/or in parallel to implement the processes.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A telecommunication system, comprising:
an anchoring network device comprising an Access Transfer Control Function (ATCF) included in a terminating Internet Protocol (IP) Multimedia Subsystem (IMS), the ATCF being configured to:
  receive, from a calling terminal that is non-Enhanced Voice Services (EVS)-capable via an originating IMS, a first initiation request of a communication session, the first initiation request indicating:
    a non-EVS media capability of the calling terminal; and
    a called terminal that is EVS-capable;
  determine a second initiation request based at least in part on the first initiation request, the second initiation request indicating an EVS Channel-Aware-mode (ChAw) codec; and
  provide the second initiation request to the called terminal; and
a network gateway configured to modify a first packet, from a sending terminal, wherein the sending terminal is one of the calling terminal and the called terminal, to provide a second packet,
wherein:
  the first packet is associated with a sending media capability;
  the second packet is associated with a receiving media capability; and the sending media capability is one, and the receiving media capability the other, of the first media capability and the second media capability.

2. The telecommunication system according to claim 1, wherein the network gateway is further configured to provide the second packet to a receiving terminal of the calling terminal and the called terminal, wherein the receiving terminal is different from the sending terminal.

3. The telecommunication system according to claim 1, wherein the network gateway is further configured to:
receive the first packet from the sending terminal, wherein the first packet comprises a first payload associated with the sending media capability;
determine a second payload based at least in part on the first payload, wherein the second payload is associated with the EVS ChAw codec; and
determine the second packet comprising the second payload.

4. The telecommunication system according to claim 1, wherein:
the anchoring network device is further configured to:
receive an initiation response that is associated with the second initiation request and that indicates a first media capability;
determine that at least one of the first media capability and the non-EVS media capability satisfies a predetermined criterion; and
provide a criterion-match indication; and
the network gateway is configured to provide the second packet in response to the criterion-match indication.

5. The telecommunication system according to claim 1, wherein the network gateway includes an Access Transfer Gateway (ATGW).

6. The telecommunication system according to claim 1, wherein the first initiation request includes a Session Initiation Protocol (SIP) INVITE message having a Session Description Protocol (SDP) body indicating the non-EVS media capability.

7. The telecommunication system according to claim 6, wherein the non-EVS media capability and the EVS ChAw codec include respective, different signal-integrity techniques.

8. The telecommunication system according to claim 1, wherein:
the non-EVS media capability comprises at least one of an Adaptive Multi-Rate (AMR) audio codec or a Pulse Code Modulated (PCM) audio codec.

9. The telecommunication system according to claim 1, wherein the anchoring network device is further configured to determine the second initiation request based at least in part on a predetermined list of acceptable media capabilities.

10. A method, comprising:
receiving, from a calling terminal that is non-Enhanced Voice Services (EVS)-capable via a first Internet Protocol (IP) Multimedia Subsystem (IMS), an initiation request of a communication session via a network;
determining that a codec list of the initiation request corresponds to a predetermined rewrite rule, wherein the codec list includes a first codec and excludes codecs of a predetermined exclusion list, the first codec being a non-EVS codec; and
applying the rewrite rule to the initiation request to provide a second initiation request having a second codec list including a second, different codec, the second codec comprising an EVS Channel-Aware-mode (ChAw) codec, wherein the method is performed by an Access Transfer Control Function (ATCF) included in a second IMS connected to the first IMS.

11. The method according to claim 10, further comprising transmitting the second initiation request via the network to a called terminal.

12. The method according to claim 11, further comprising:
receiving an initiation response from the called terminal via the network, the initiation response including a third codec list having a third codec;
applying a second predetermined rewrite rule to the third codec list to provide a second initiation response including a fourth codec list having a fourth codec different from the third codec.

13. The method according to claim 12, further comprising filtering the fourth codec list based on a predetermined acceptable-codec list.

14. The method according to claim 12, further comprising receiving the initiation request from the calling terminal and transmitting the second initiation response via the network to the calling terminal.

15. The method according to claim 10, further comprising transmitting a rewrite indication via a network to a network gateway.

16. An anchoring network device comprising:
a communications interface;
at least one processor; and
a memory storing instructions that, when executed by the at least one processor, cause the at least one processor to perform operations comprising:
receiving, from a calling terminal that is non-Enhanced Voice Service (EVS) capable, a first initiation request of a communication session via the communications interface, wherein the first initiation request indicates at least one offered media capability that is a non-EVS capability;
determining if there is a common media capability between the first initiation request and a predetermined exclusion list comprising at least one exclusion media capability;
in response to a determination that there is a common media capability, determining a second initiation request based at least in part on the first initiation request, wherein each of a plurality of second media capabilities indicated in the second initiation request is also indicated in the first initiation request;
in response to a determination that there is not a common media capability, determining the second initiation request based at least in part on the first initiation request, wherein the second initiation request indicates an additional media capability that is not indicated in the first initiation request, the additional media capability comprising an EVS Channel-Aware-mode (ChAw) codec; and
transmitting the second initiation request via the communications interface, wherein the anchoring network device is an Access Transfer Control Function (ATCF) included in a first Internet Protocol (IP) Multimedia Subsystem (IMS), the calling terminal and the communications interface being connected by the first IMS and a second IMS.

17. The anchoring network device according to claim 16, wherein the operations further comprise receiving the first initiation request from the calling terminal and transmitting the second initiation request to a called terminal.

18. The anchoring network device according to claim 16, wherein the predetermined exclusion list comprises the additional media capability.

19. The anchoring network device according to claim 16, wherein:
- the operations further comprise, in response to a determination that there is not a common media capability, determining the second initiation request further indicating a second additional media capability that is not indicated in the first initiation request; and
- the additional media capability requires the second additional media capability.

20. The anchoring network device according to claim 16, wherein the first IMS comprises an originating IMS and the second IMS comprises a terminating IMS.

* * * * *